United States Patent
Covel et al.

(10) Patent No.: US 10,569,434 B2
(45) Date of Patent: Feb. 25, 2020

(54) MULTIPURPOSE CUTTING TOOL

(71) Applicant: Leatherman Tool Group, Inc., Portland, OR (US)

(72) Inventors: Melissa L. Covel, Vancouver, WA (US); Tony Steven Peterson, Woodland, WA (US)

(73) Assignee: LEATHERMAN TOOL GROUP, INC., Portland, OR (US)

( * ) Notice: Subject to any disclaimer, the term of this patent is extended or adjusted under 35 U.S.C. 154(b) by 644 days.

(21) Appl. No.: 14/881,531

(22) Filed: Oct. 13, 2015

(65) Prior Publication Data

US 2016/0031098 A1 Feb. 4, 2016

Related U.S. Application Data

(63) Continuation of application No. 13/566,304, filed on Aug. 3, 2012, now Pat. No. 9,187,114.

(51) Int. Cl.
*B26B 13/22* (2006.01)
*B62B 13/00* (2006.01)
*B26B 13/00* (2006.01)
*B26B 1/04* (2006.01)

(52) U.S. Cl.
CPC ............. *B26B 13/22* (2013.01); *B26B 1/04* (2013.01); *B26B 13/005* (2013.01); *B62B 13/005* (2013.01)

(58) Field of Classification Search
CPC ......... B26B 13/005; B26B 13/22; B26B 1/04; B26B 13/28; B26B 13/26
See application file for complete search history.

(56) References Cited

U.S. PATENT DOCUMENTS

| 617,018 | A | * | 1/1899 | Henault | ............. B26B 13/24 30/226 |
| 1,524,694 | A | | 2/1925 | Di Maio | |
| 2,952,912 | A | | 9/1960 | Crawford | |

(Continued)

FOREIGN PATENT DOCUMENTS

GB    116 221 A    6/1918

OTHER PUBLICATIONS

Extended European Search Report for Application No. EP 13 00 3903; dated Mar. 5, 2014.

(Continued)

*Primary Examiner* — Stephen Choi
(74) *Attorney, Agent, or Firm* — Alston & Bird LLP

(57) ABSTRACT

A cutting tool is provided which may include a first blade and a second blade rotatably coupled to the first blade. The cutting tool may include a first handle rotatably coupled to the first blade, the first handle rotatable between a deployed position and a folded position, and a second handle rotatably coupled to the second blade, the second handle rotatable between a deployed position and a folded position. The cutting tool may also include a first rotation lock configured to hold the first handle fixed relative to the first blade. The first handle may be configured to be rotatable relative to the first blade in response to the first rotation lock being disengaged. The first rotation lock may be configured to be held in the disengaged position in response to the first handle being disposed between the deployed position and the folded position.

10 Claims, 19 Drawing Sheets

(56) References Cited

U.S. PATENT DOCUMENTS

| | | | | |
|---|---|---|---|---|
| 3,196,540 | A * | 7/1965 | Porzky | A01G 3/0475 |
| | | | | 30/254 |
| 4,658,456 | A * | 4/1987 | Tsai | B25B 7/00 |
| | | | | 7/135 |
| 5,722,171 | A | 3/1998 | Schmidt | |
| 5,860,215 | A * | 1/1999 | Roskam | B26B 13/26 |
| | | | | 30/254 |
| 6,434,832 | B1 * | 8/2002 | Garrett | B26B 13/24 |
| | | | | 30/226 |
| 2003/0115758 | A1 | 6/2003 | Chen | |
| 2007/0204409 | A1 | 9/2007 | Yale et al. | |

OTHER PUBLICATIONS

Patent Examination Report AU Patent Application No. 2013211520 dated Aug. 21, 2015.
Partial European Search Report for Application No. EP 13 00 3903; dated Nov. 5, 2013.
Office Action received in European Application No. 13003903.5 dated Feb. 27, 2018 2 pages.

* cited by examiner

US 10,569,434 B2

MULTIPURPOSE CUTTING TOOL

CROSS-REFERENCE TO RELATED APPLICATIONS

This application claims priority to and is a divisional application of U.S. patent application Ser. No. 13/566,304, filed on Aug. 3, 2012, the contents of which are hereby incorporated by reference in their entirety.

FIELD OF THE INVENTION

Embodiments of the present invention relate generally to a multipurpose cutting tool and, more particularly, to a collapsible or folding pair of shears configured with additional features.

BACKGROUND

Cutting tools such as shears or scissors are common instruments for cutting a variety of materials ranging from paper and textiles to plastics and metals. The sizes and shapes of cutting tools may be configured based upon the material they are intended to cut. For example, small scissors may be used for various materials associated with sewing, such as threads or fabrics, or they may be used for cutting paper. Larger scissors or shears may be configured to cut through thicker or tougher materials, such as cardboard or fiber glass, for example.

Multipurpose tools are widely popular for their utility in a substantial number of different applications. As its name suggests, a multipurpose tool includes a number of tools carried by a common frame. A multipurpose tool may include different combinations of tools depending upon its intended application. For example, multipurpose tools that are designed for a more universal or generic application can include pliers, a wire cutter, a bit driver, one or more knife blades, a saw blade, a bottle opener or the like. Other multipurpose tools are designed to service more specific applications or niche markets and correspondingly include tools that are useful for the intended application. For example, multipurpose tools may be specifically designed for automobile repairs, hunting, fishing or other outdoor applications, gardening and the like.

One reason for the popularity of multipurpose tools is the capability provided by a multipurpose tool to provide a wide range of functionality with a single tool, thereby reducing the need to carry a number of different tools to perform those same functions. For example, a single multipurpose tool may be carried instead of a pair of pliers, one or more screwdrivers, a knife and a bottle opener. As such, the burden upon a user is reduced since the user need only carry a single multipurpose tool.

As multipurpose tools are frequently carried by users in the field, it is desirable for the multipurpose tools to be relatively small and lightweight while remaining rugged so as to resist damage. In order to reduce the overall size of a multipurpose tool, some multipurpose tools have been designed to be foldable. In this regard, foldable multipurpose tools are designed to move between a closed position and an open position. Generally, the closed position is more compact with the multipurpose tool frequently being carried in the closed position.

It may be desirable for the multipurpose tool to include additional functionality. As such, the present applicant has designed a multipurpose cutting tool having a compact configuration, even in instances in which the multipurpose cutting tool includes additional functionality.

BRIEF SUMMARY OF THE INVENTION

Embodiments of the present invention may include a multipurpose cutting tool. In particular, an example embodiment of a cutting tool may include a first blade and a second blade rotatably coupled to the first blade. The cutting tool may include a first handle rotatably coupled to the first blade, the first handle rotatable between a deployed position and a folded position, and a second handle rotatably coupled to the second blade, the second handle rotatable between a deployed position and a folded position. The cutting tool may also include a first rotation lock configured to hold the first handle fixed relative to the first blade. The first handle may be configured to be rotatable relative to the first blade in response to the first rotation lock being disengaged. The first rotation lock may be configured to be held in the disengaged position in response to the first handle being disposed between the deployed position and the folded position. The first handle in the folded position may be configured to engage the second blade and the second handle in the folded position may be configured to engage the first blade. The cutting tool may also include a second rotation lock configured to hold the second handle fixed relative to the second blade.

Example embodiments of the present invention may include a cutting tool including a first member that includes a first blade, a third blade, and a first handle and a second member that is pivotably coupled to the first member and includes a second blade, a fourth blade, and a second handle. A first cutting nip may be defined between the first blade and the second blade, and a second cutting nip may be defined between the third blade and the fourth blade. A gap may be defined between the first handle and the second handle. Each of the gap, the first cutting nip, and the second cutting nip may be configured to be simultaneously opened and closed as the first member pivots relative to the second member, and the gap, the first cutting nip, and the second cutting nip may each be disposed at mutually exclusive positions around a pivot point between the first member and the second member. The second cutting nip may be configured to apply a higher cutting force relative to the first cutting nip in response to equal closing force applied between the first handle and the second handle. The first cutting nip and the second cutting nip may each extend from the pivot point, and wherein neither the first cutting nip nor the second cutting nip may be disposed between the first handle and the second handle.

Embodiments of the present invention may include a cutting tool that includes a first blade defining a first cutting edge along a portion of a length of the first blade, a second blade defining a second cutting edge along a portion of a length of the second blade, where the first blade and the second blade are pivotably connected at a pivot point. A cutting nip may be defined at a point where the first cutting edge meets the second cutting edge as the first blade pivots relative to the second blade, and the first blade may include a surface with a plurality of serrations extending therefrom proximate the first cutting edge. A face of each serration facing away from the pivot point may be disposed at a first angle from the surface and a face of each serration facing toward the pivot point may be disposed at a second angle from the surface, wherein the second angle is smaller than the first. A height of the plurality of serrations may increase relative to the surface as the plurality of serrations approaches the pivot point. The serrations may be configured to provide a first level of resistance to material moving into the cutting nip and a second level of resistance to material moving away from the cutting nip, where the second level of resistance is greater than the first level of resistance. Embodiments of the cutting tool may further include a third blade having a third cutting edge and a fourth blade having a fourth cutting edge, the third blade and the fourth blade defining a cutting nip there between, where the third blade and the fourth blade include non-serrated surfaces proximate the third cutting edge and the fourth cutting edge.

Embodiments of the present invention may include a cutting tool with a first blade including a tip and a proximal portion and a second blade including a tip and a proximal portion, where a pivot point rotatably couples the proximal portion of the first blade to the proximal portion of the second blade. Each of the first blade and the second blade may include a height extending in a direction of motion when the first blade pivots relative to the second blade, a length extending between the proximal portion and the tip, and a width orthogonal to the length and height, where the width of the first blade increases along the length of the blade from the proximal portion to the tip. The width of the second blade may increase along the length of the second blade from the proximal portion to the tip. The first blade and the second blade may each include a cutting edge disposed along their respective lengths, and the first blade may include a serrated surface adjacent to the cutting edge of the first blade. The serrated surface may include a plurality of serrations where the serrations increase in height between the tip of the first blade and the proximal portion of the first blade. The first blade may include a first cutting surface extending along a portion of its length and the second blade may include a second cutting surface extending along a portion of its length, where a cutting nip is defined where the first cutting surface meets the second cutting surface as the first blade rotates relative to the second blade. As the first blade engages the second blade, the cutting nip drives the first blade away from the second blade along its length.

Further embodiments of the present invention may include a tool that includes a tool body, a cutting implement rotatably connected to the tool body and movable between a stowed position and a deployed position, where the cutting implement includes a locking surface. The tool may further include a locking mechanism attached to the tool body configured to secure the cutting implement in the deployed position and including an engagement surface. The locking mechanism may be of a different material than the tool body. The locking mechanism may be biased in a locked position, where the engagement surface of the locking mechanism engages the locking surface of the cutting implement in response to the cutting implement being rotated to the deployed position. The locking mechanism may include a pressing surface, where the engagement surface of the locking mechanism may be configured to be disengaged from the locked position in response to a user pressing the pressing surface. The cutting implement may be configured to hold the locking mechanism in an unlocked position when the cutting implement is disposed in the stowed position.

BRIEF DESCRIPTION OF THE SEVERAL VIEWS OF THE DRAWINGS

Figure 1:
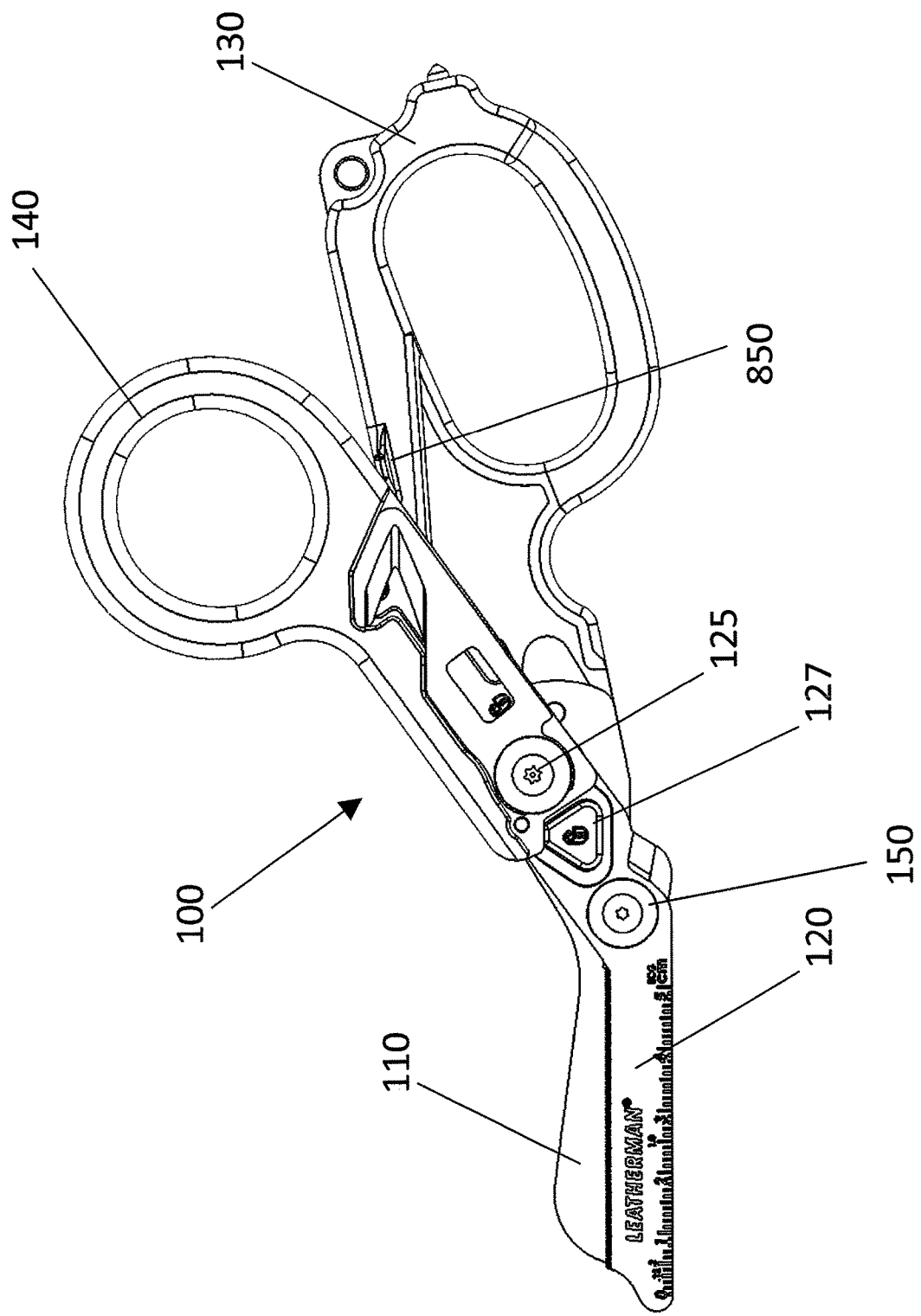
Figure 2:
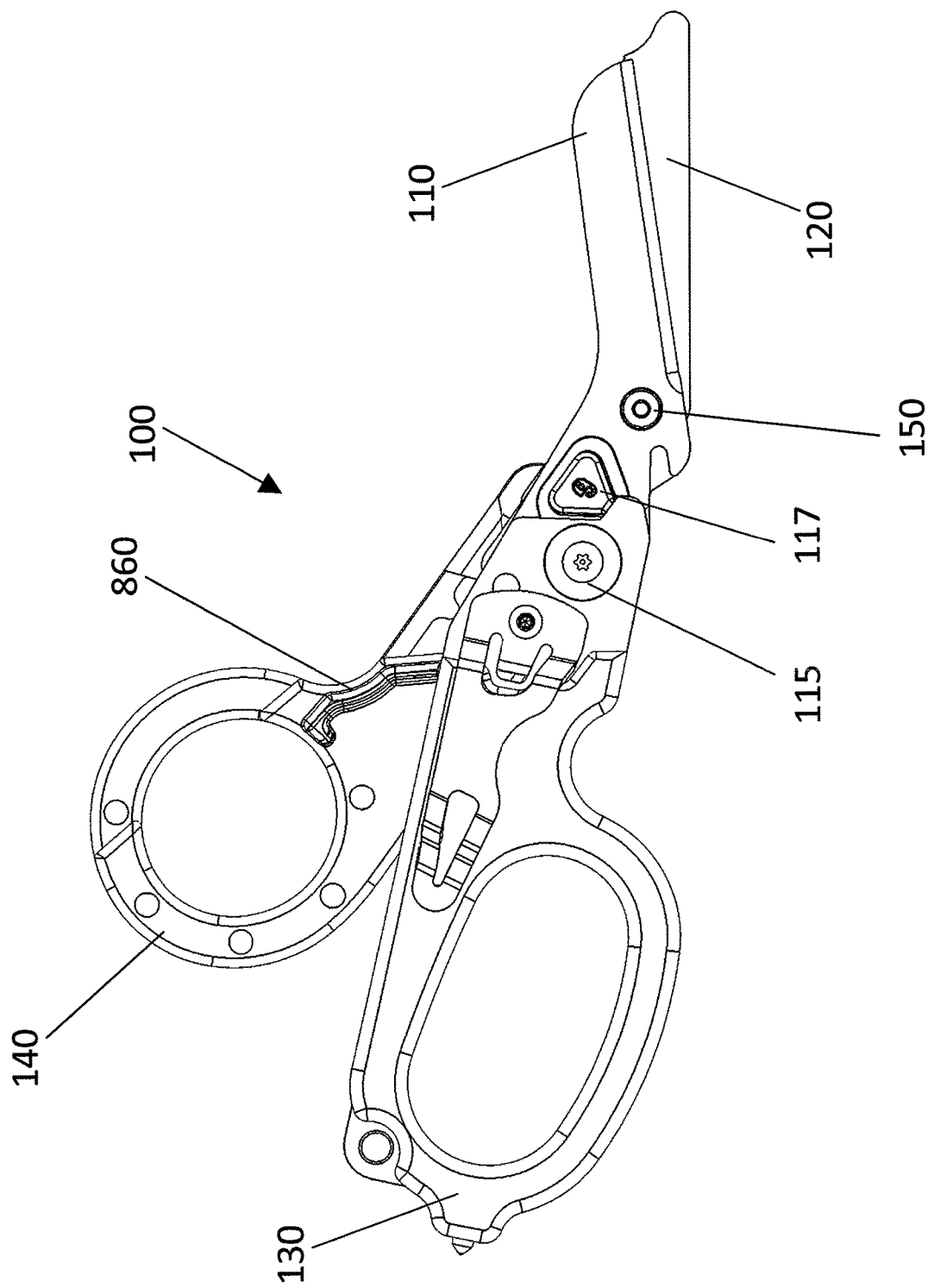
Figure 3:
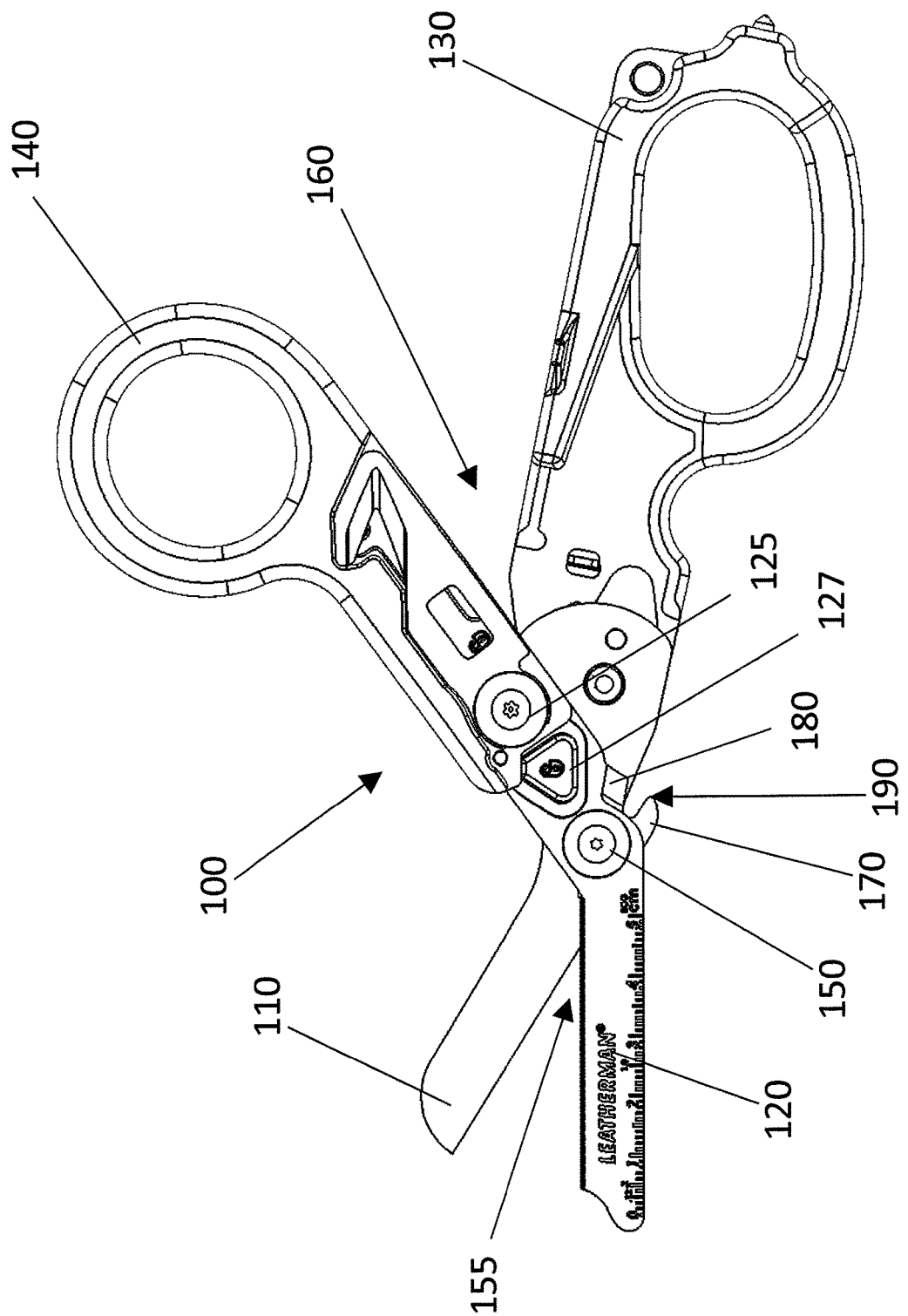
Figure 4:
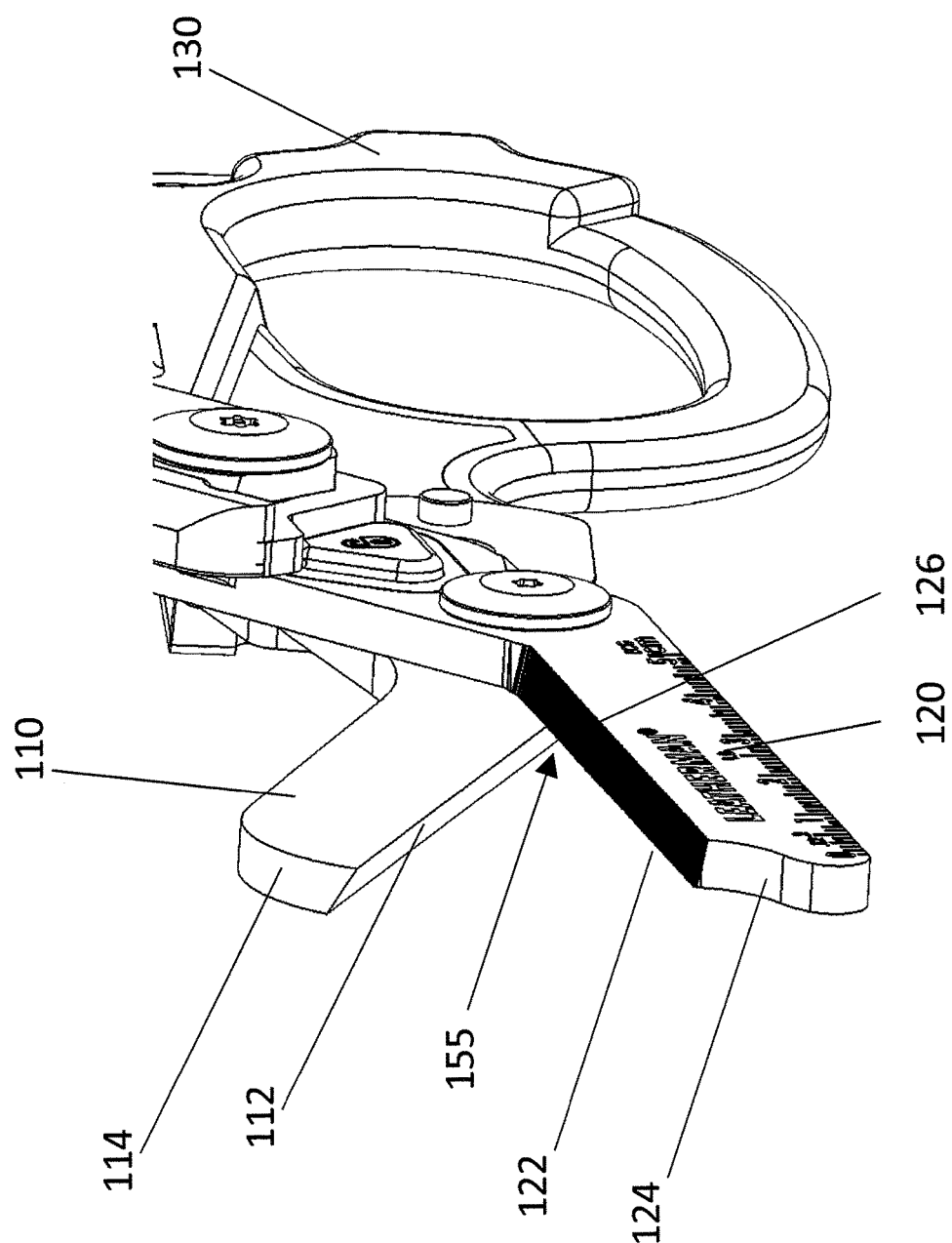
Figure 5:
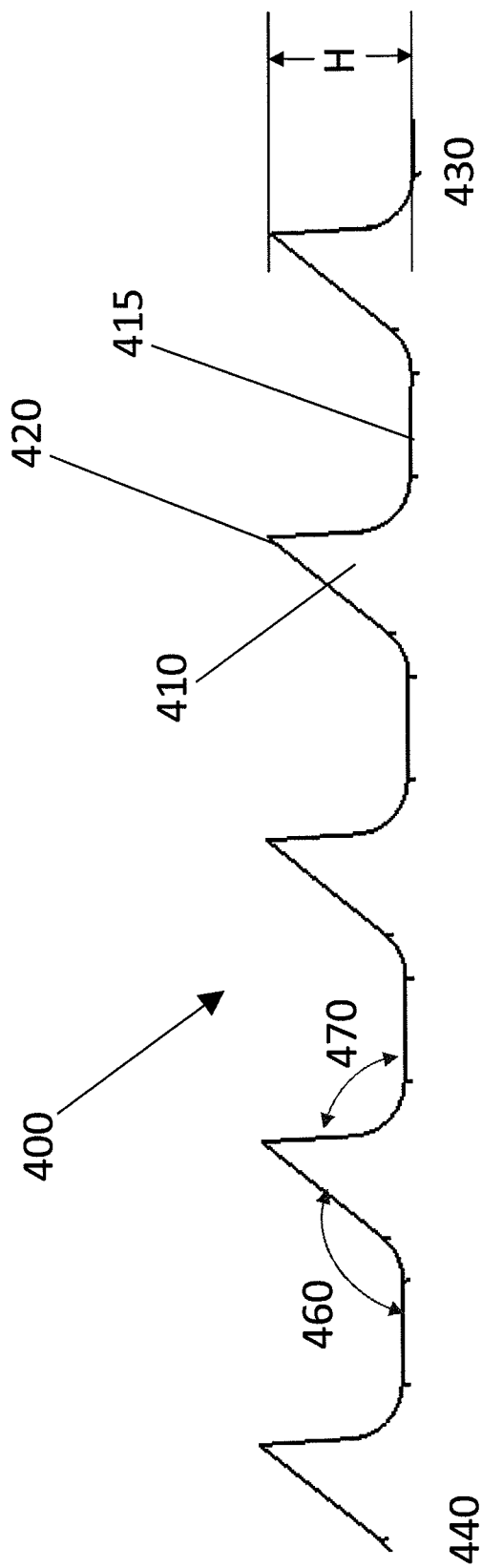
Figure 6:
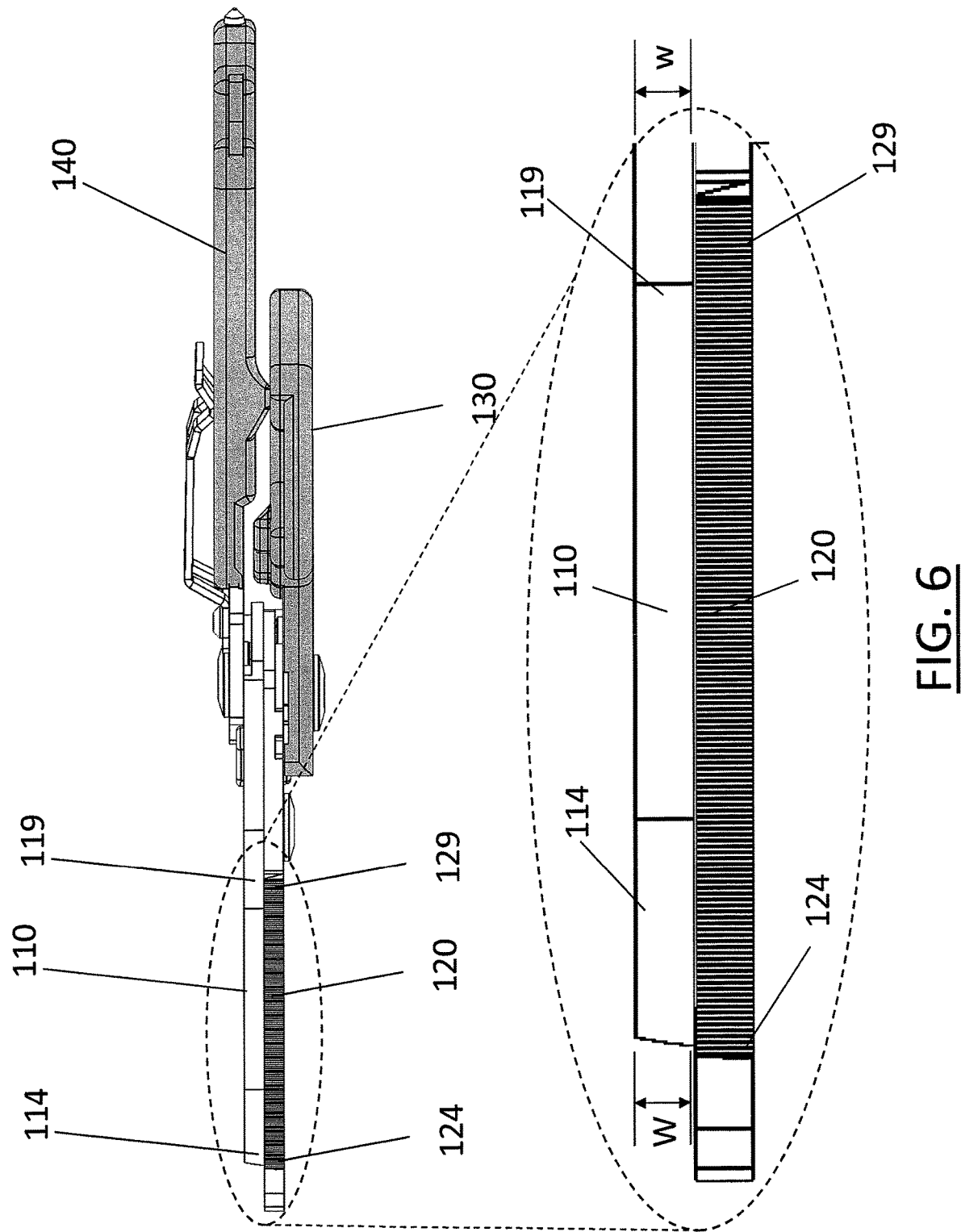
Figure 7:
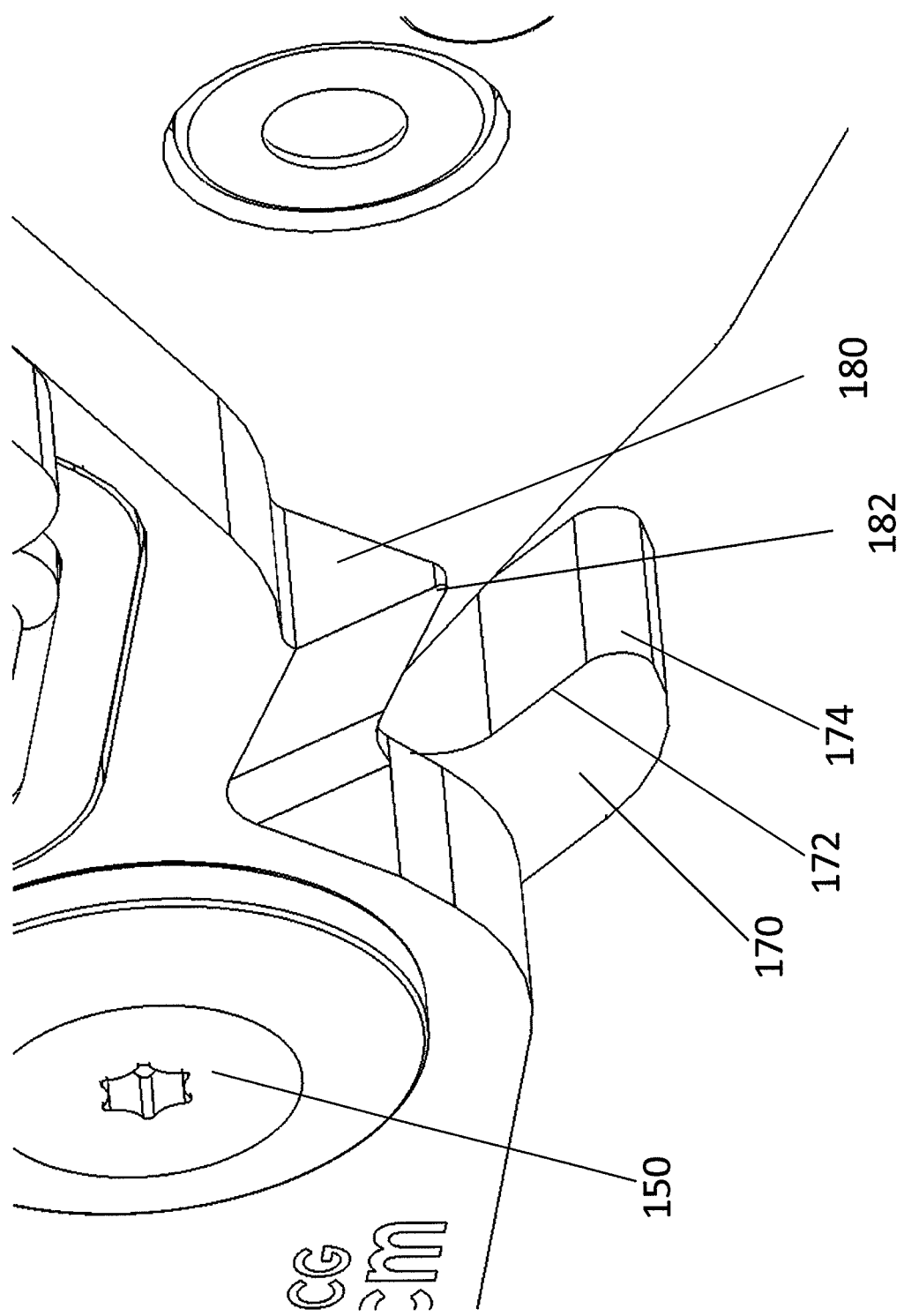
Figure 8A:
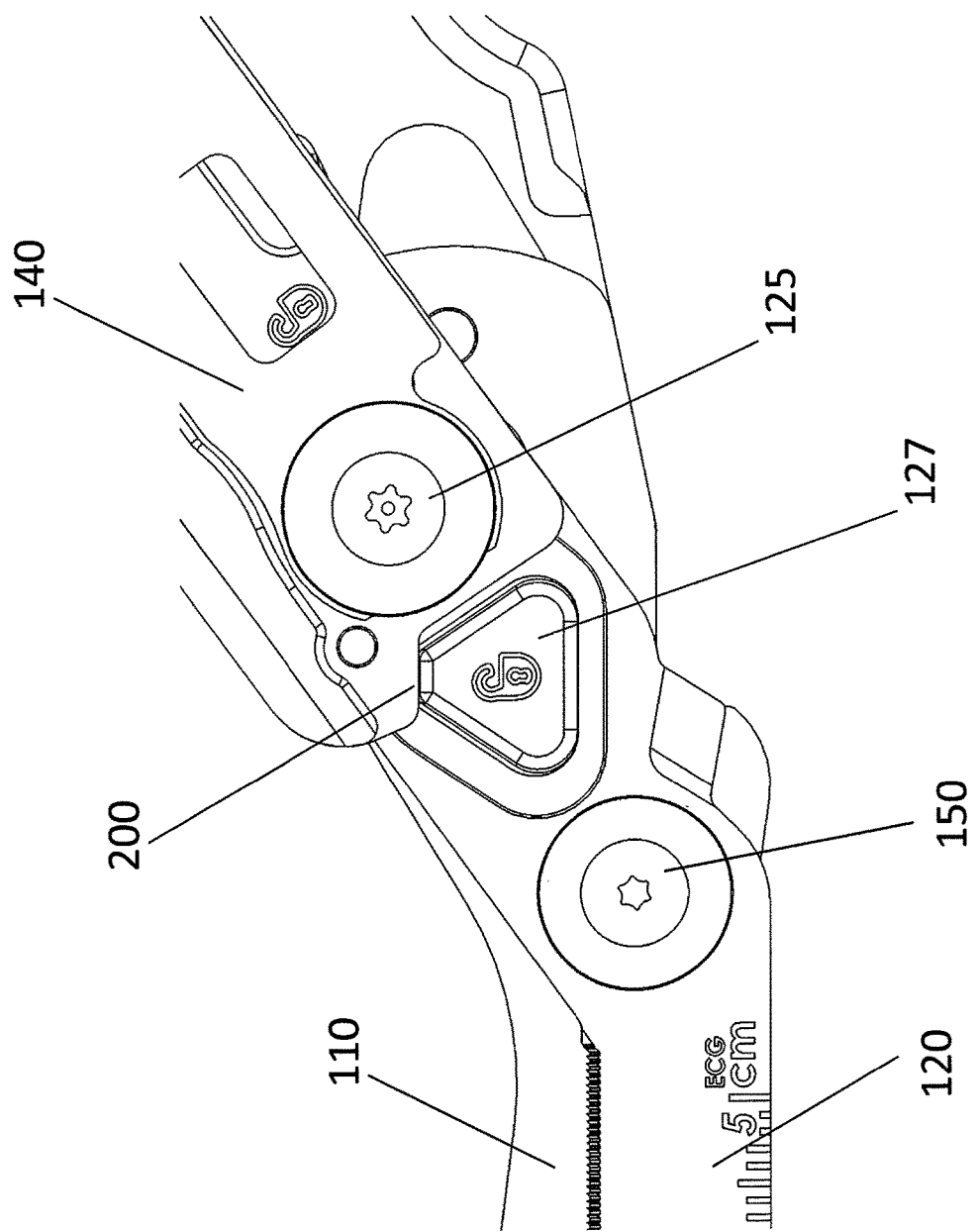
Figure 8B:
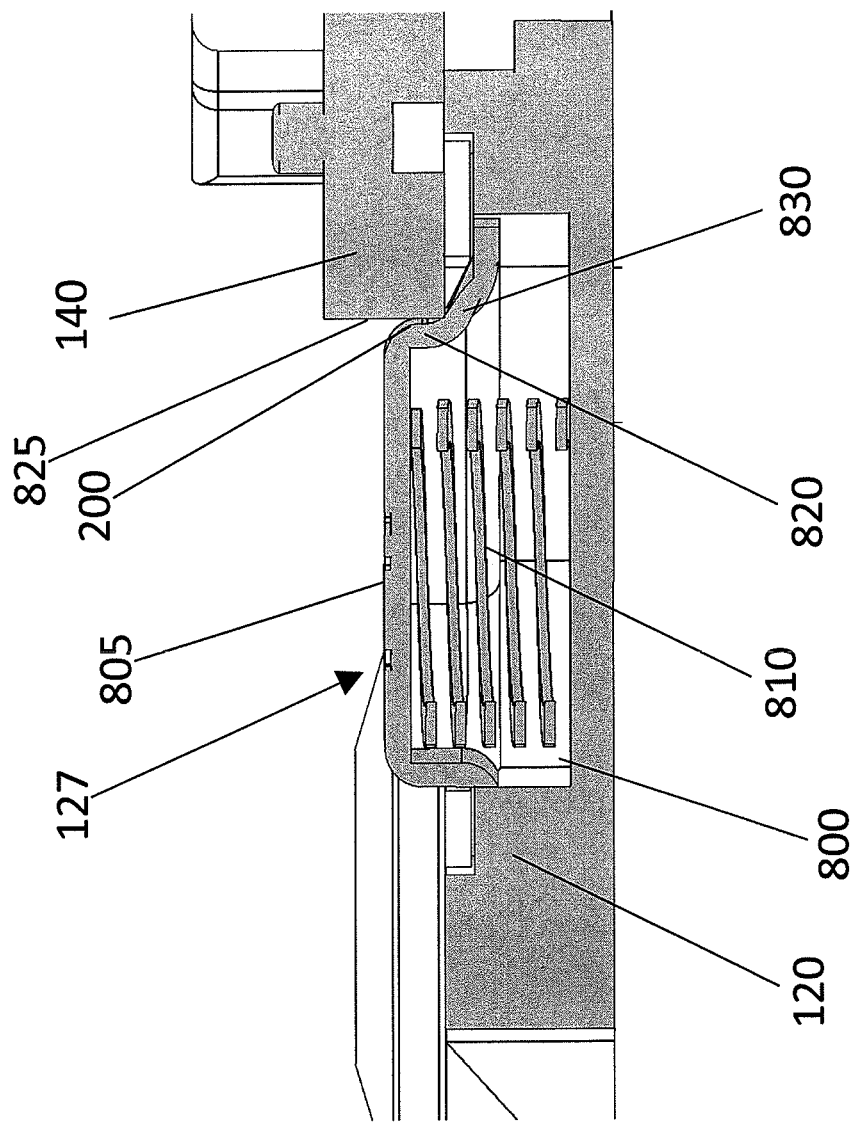
Figure 9:
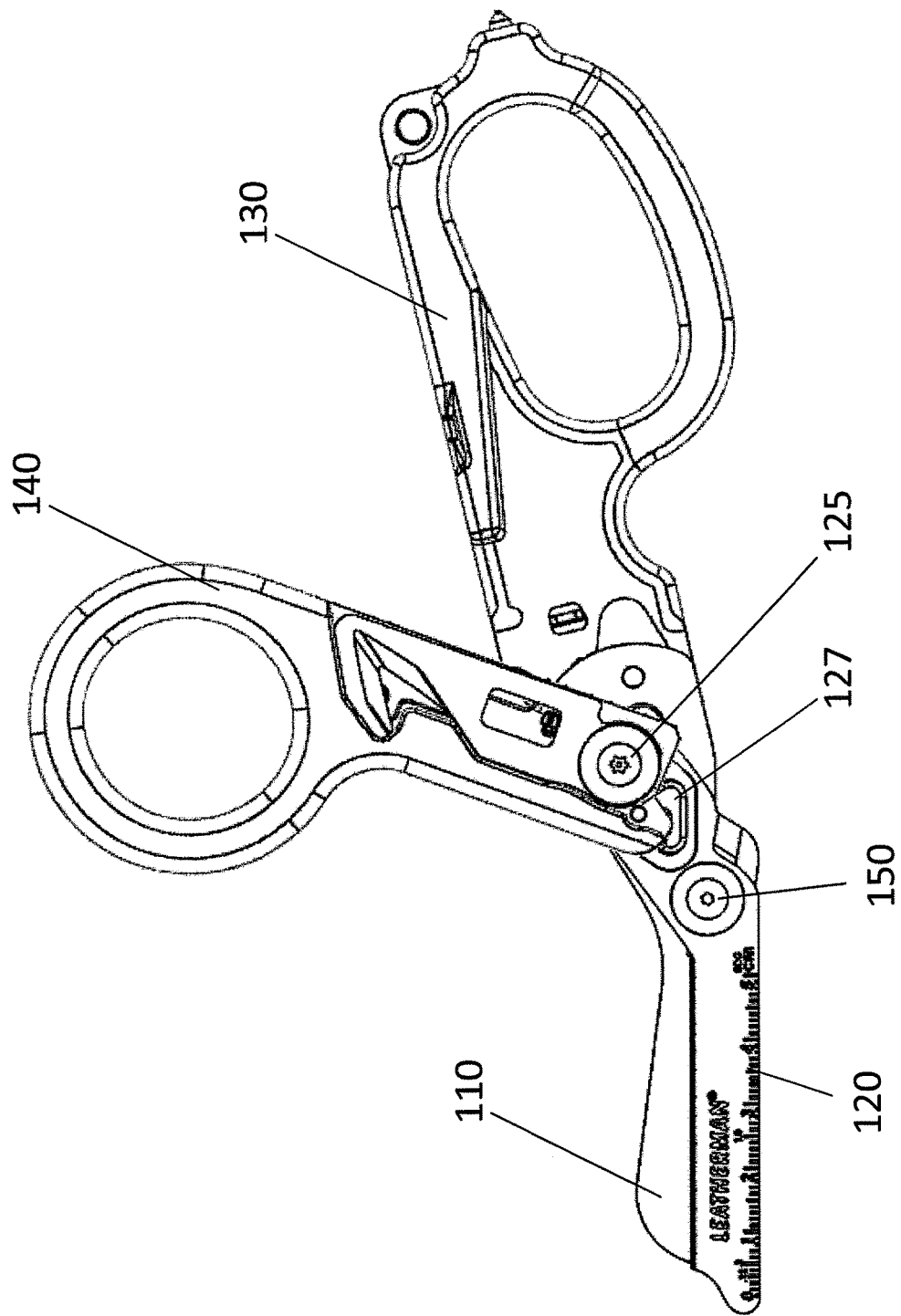
Figure 10:
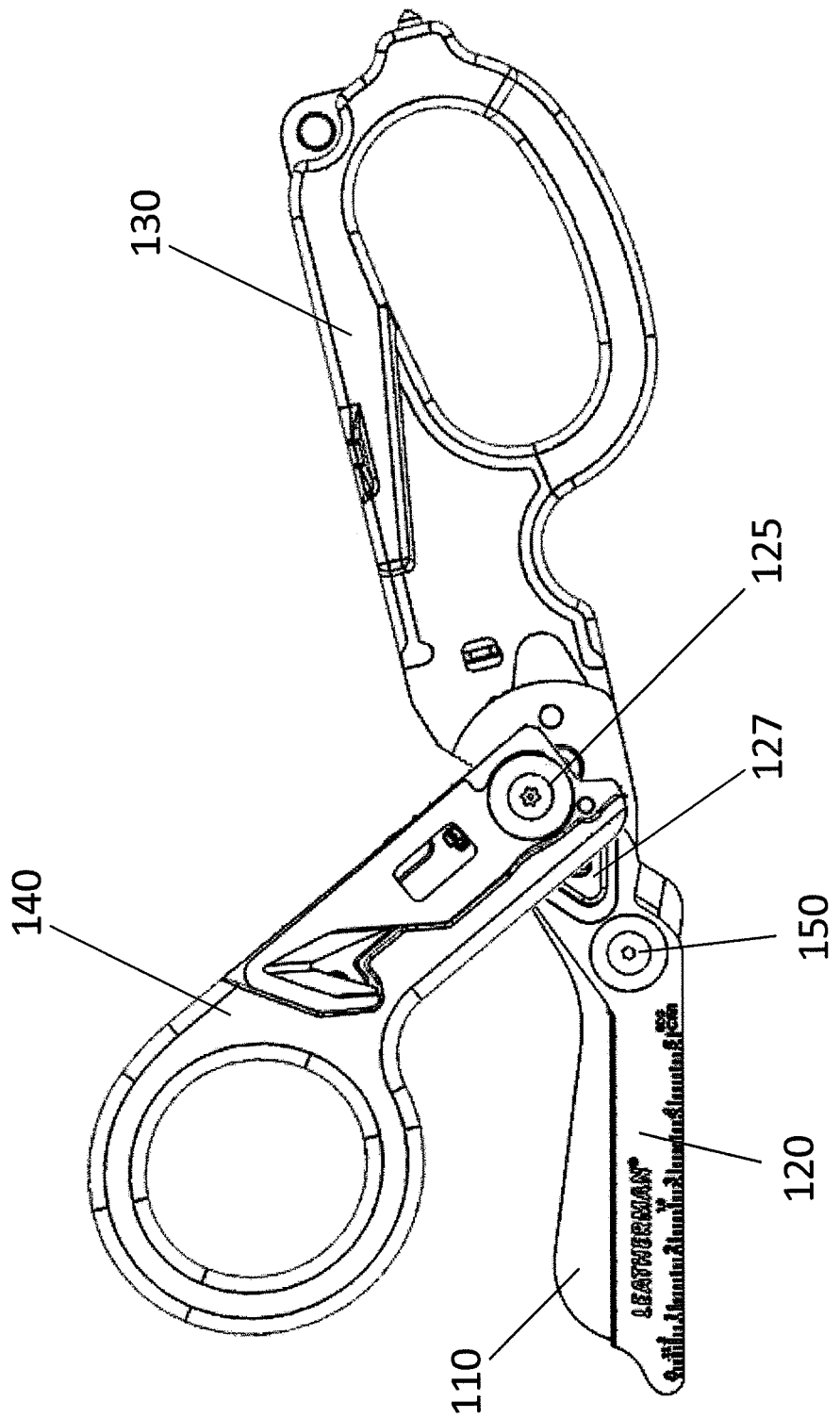
Figure 11:
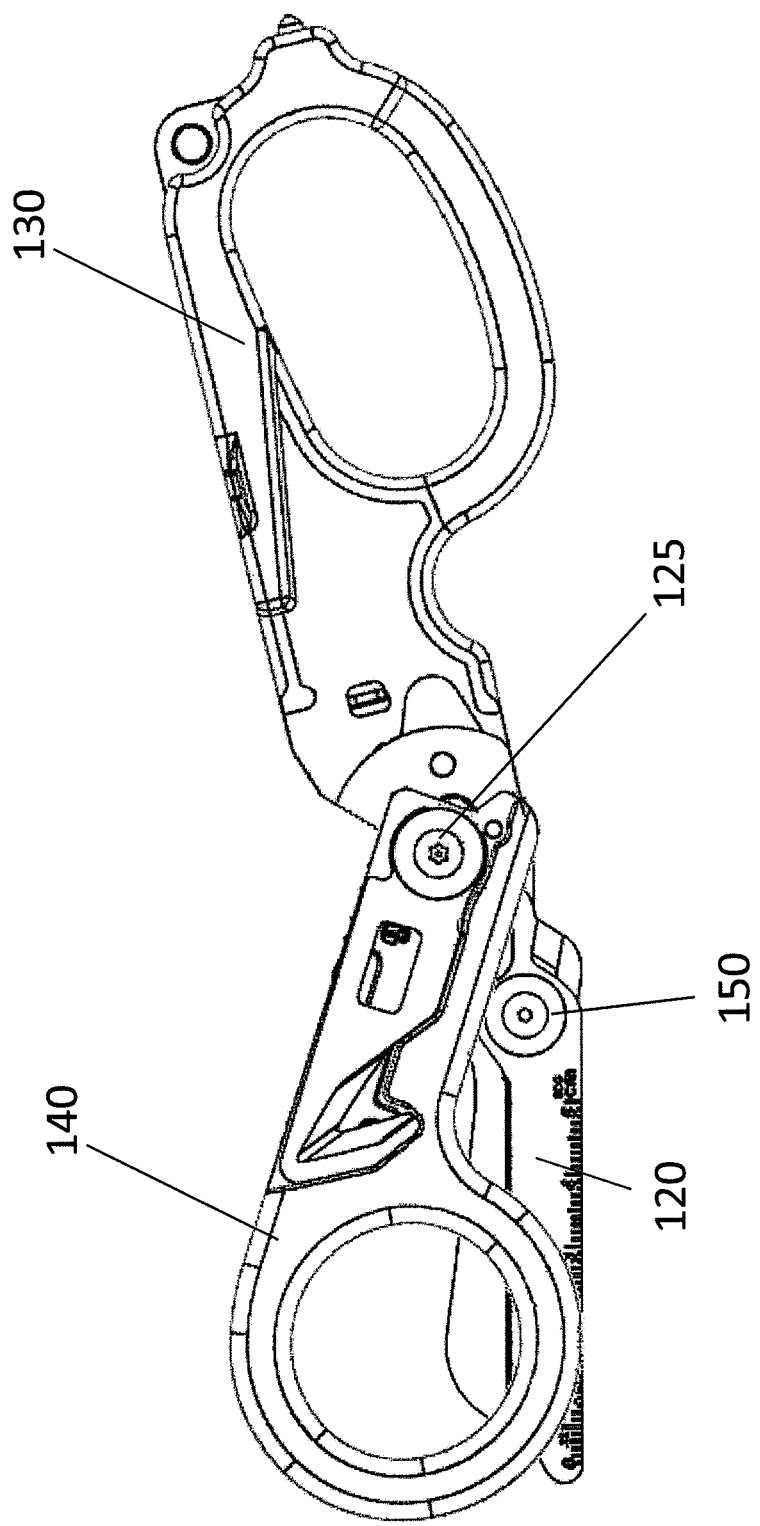
Figure 12:
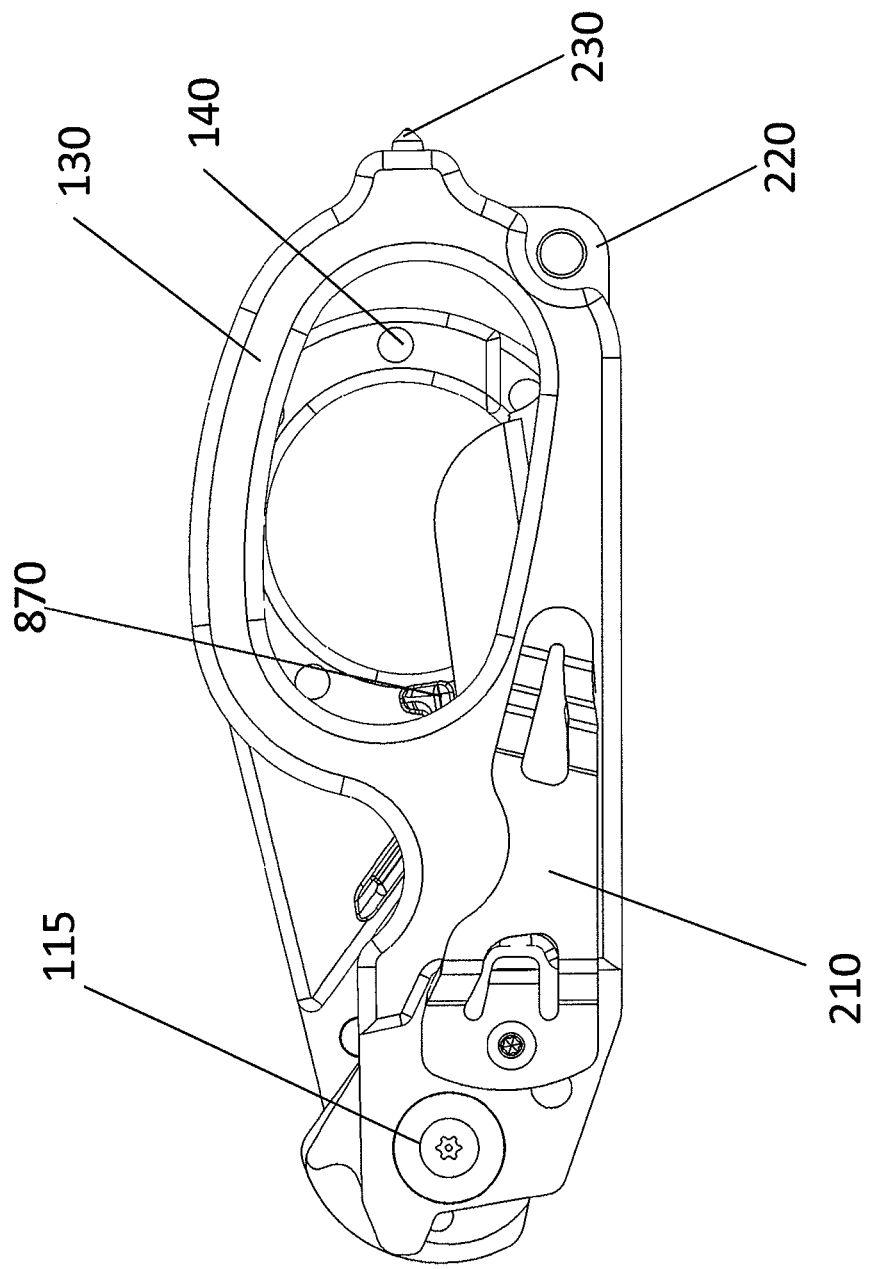
Figure 13:
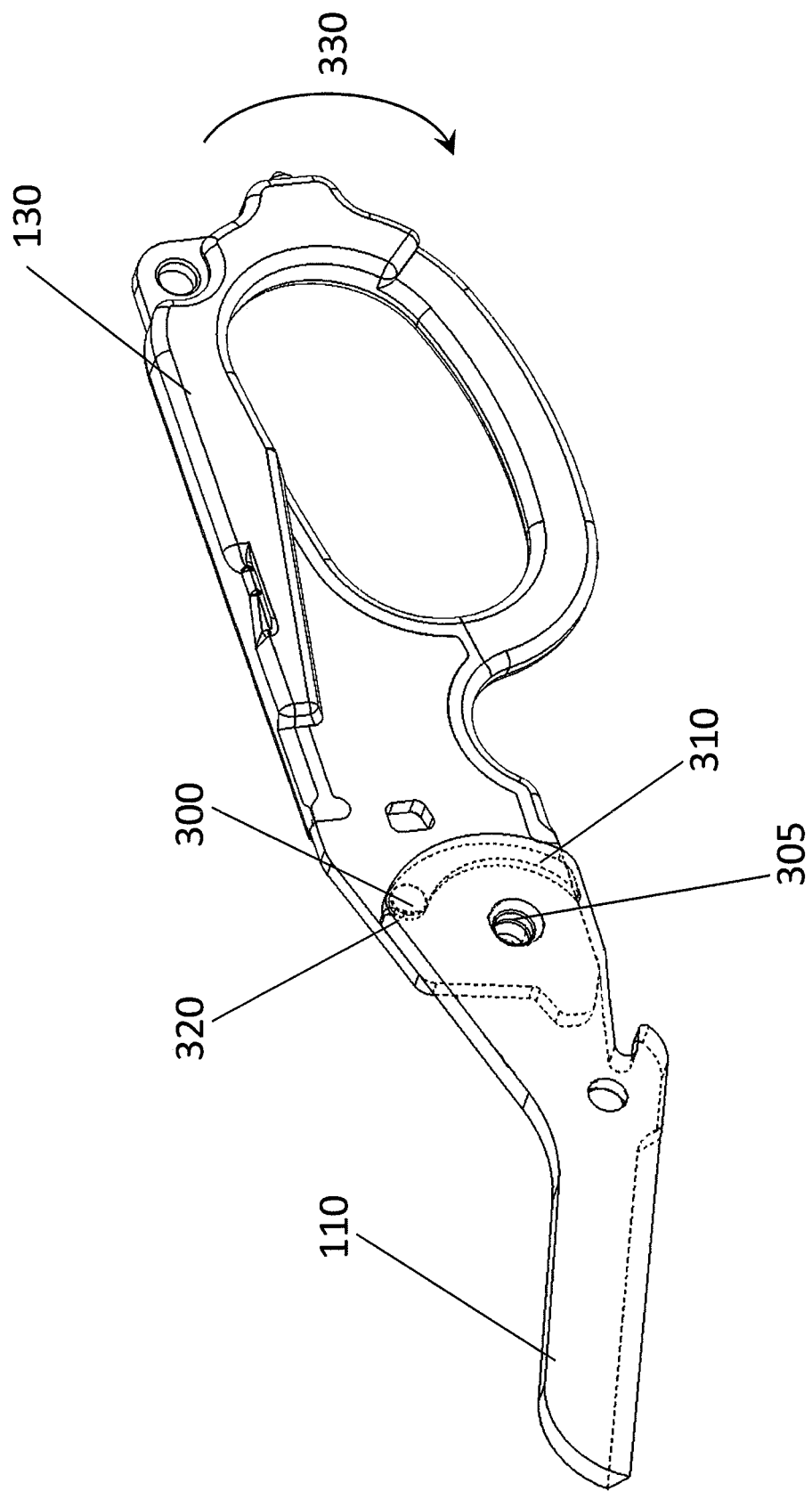
Figure 14:
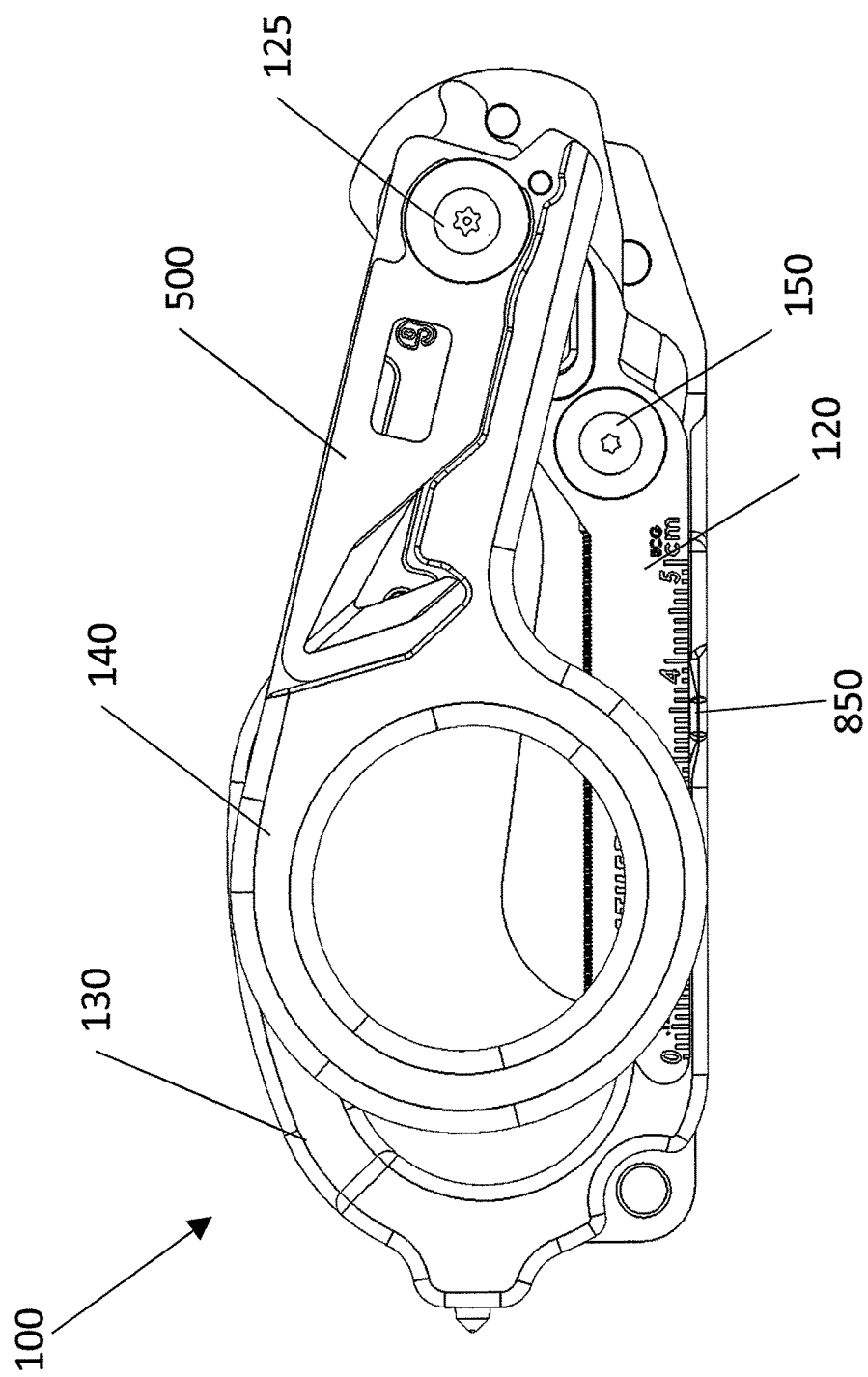
Figure 15:
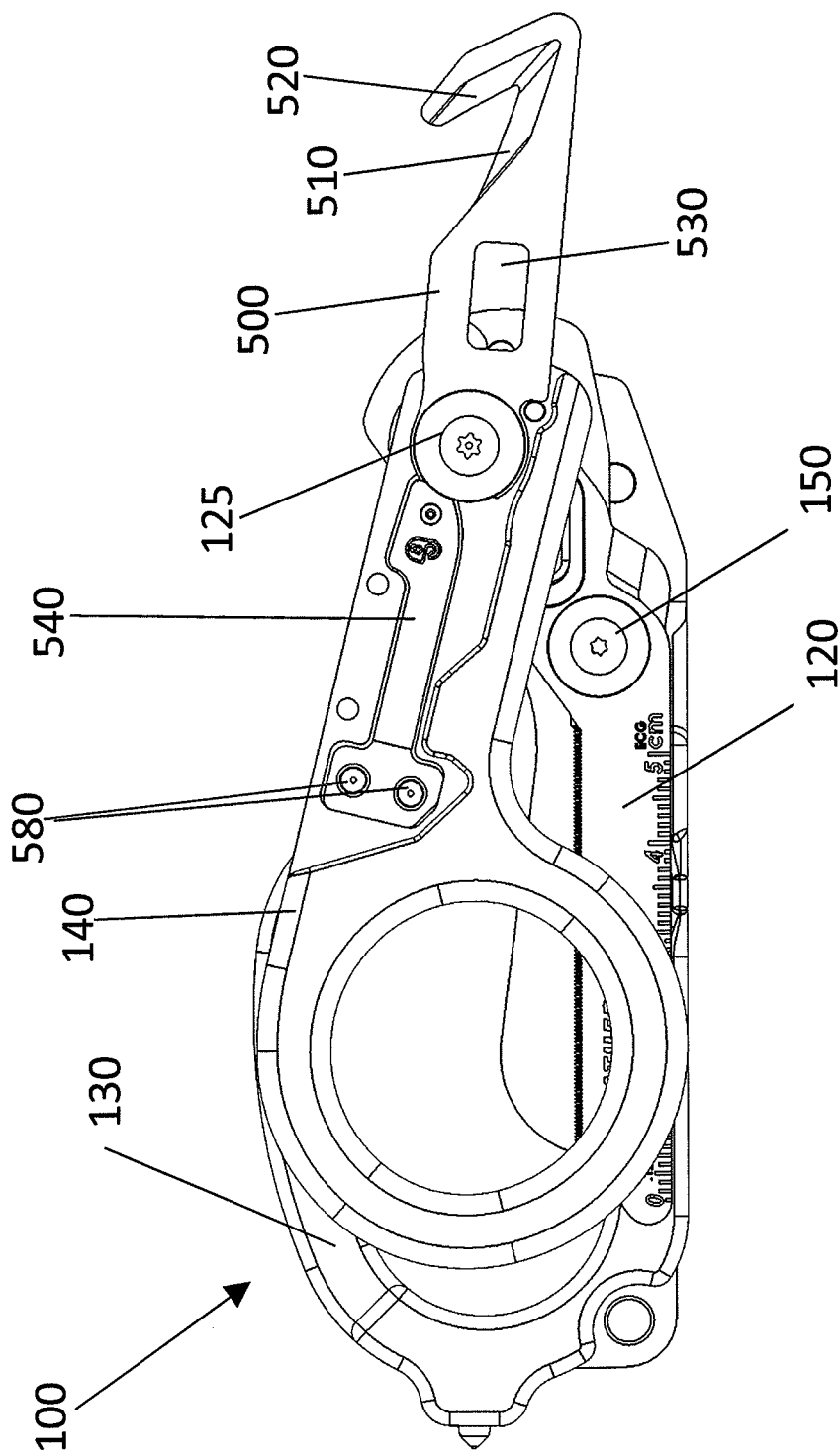
Figure 16:
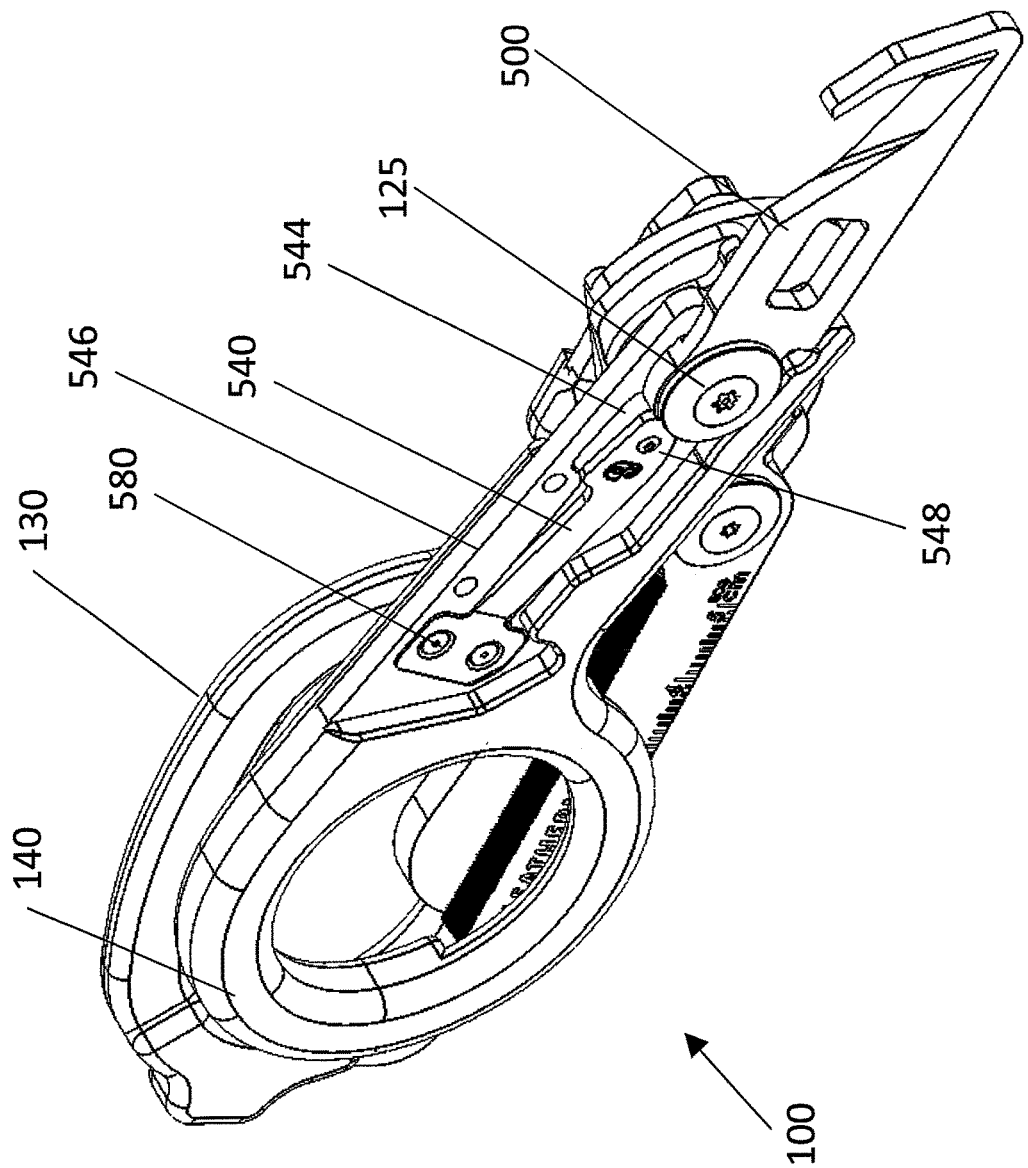
Figure 17:
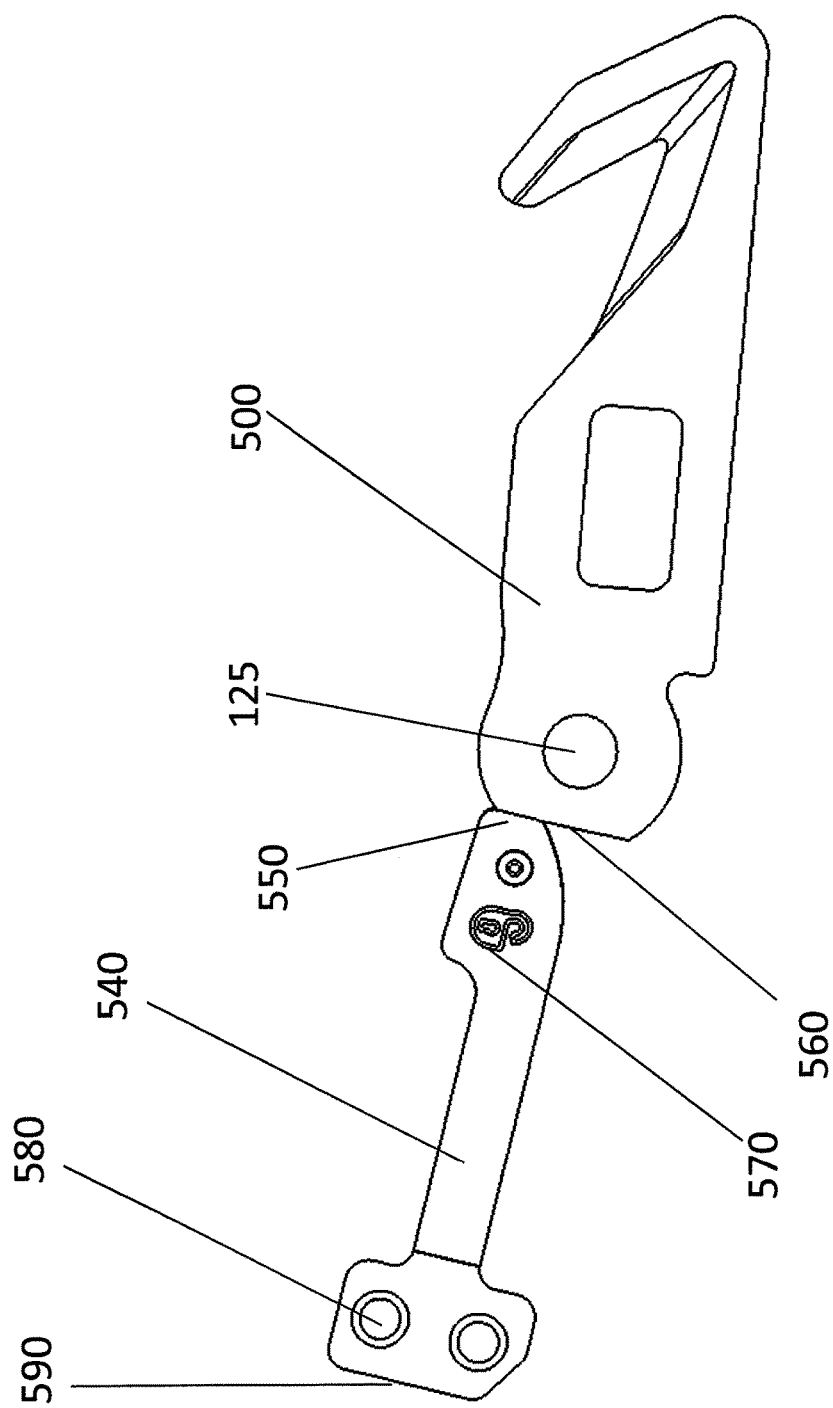
Figure 18:
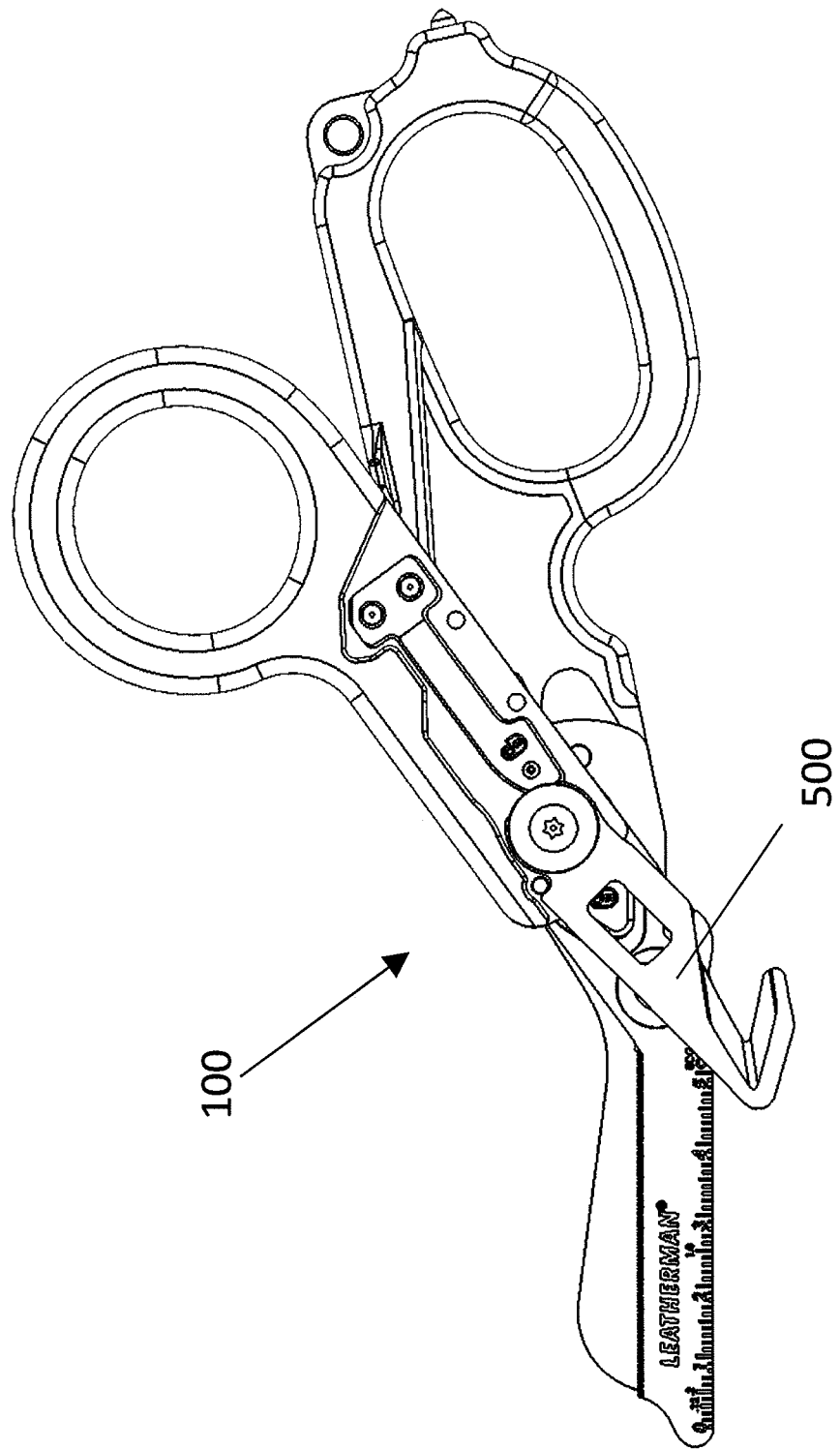

Having thus described the invention in general terms, reference will now be made to the accompanying drawings, which are not necessarily drawn to scale, and wherein:

FIG. 1 illustrates a front side view of an embodiment of a multipurpose cutting tool according to the present invention;

FIG. 2 illustrates a back side view of the multipurpose cutting tool of FIG. 1;

FIG. 3 illustrates the front side view of the multipurpose cutting tool of FIG. 1 in the open configuration;

FIG. 4 illustrates an enlarged perspective view of the first cutting nip of the multipurpose cutting tool of FIG. 1;

FIG. 5 depicts the profile of a serrated edge of a blade according to an example embodiment of the invention;

FIG. 6 illustrates a top view and a detail view of a multipurpose cutting tool according to an example embodiment of the invention;

FIG. 7 illustrates an enlarged perspective view of the second cutting nip of the multipurpose cutting tool of FIG. 1;

FIG. 8A depicts an enlarged view of a mechanism for locking a handle in alignment with a blade according to one embodiment of the invention;

FIG. 8B depicts a cross section view of the mechanism for locking a handle in alignment with the blade according to the embodiment of FIG. 8A;

FIG. 9 illustrates the front view of a multipurpose cutting tool according to the present invention, where a handle is positioned between the deployed position and the folded position;

FIG. 10 illustrates the front view of the multipurpose cutting tool according to the embodiment of FIG. 9, where the handle is positioned between the deployed position and the folded position;

FIG. 11 depicts the front view of the multipurpose cutting tool according to the embodiment of FIGS. 9 and 10 with a handle in the folded position;

FIG. 12 illustrates a front view of the multipurpose cutting tool according to the embodiment of FIGS. 9 through 11 with both of the handles in the folded position;

FIG. 13 depicts a handle interfacing a blade of an example embodiment of the present invention;

FIG. 14 illustrates a front view of a multipurpose cutting tool of an example embodiment of the invention in the folded position;

FIG. 15 illustrates the multipurpose cutting tool of FIG. 14 with a fixed-blade cutting tool deployed;

FIG. 16 illustrates a perspective view of the multipurpose cutting tool of FIG. 15 with the fixed-blade cutting tool deployed;

FIG. 17 illustrates an example embodiment of a locking feature engaging a fixed-blade cutting tool according to one embodiment of the present invention; and FIG. 18 illustrates a front view of a multipurpose cutting tool in the deployed position with a fixed-blade cutting tool also in the deployed position according to an example embodiment of the invention.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring now to FIG. 1, a multipurpose cutting tool 100 according to one embodiment of the present invention is depicted. The multipurpose cutting tool includes a first blade 110, a second blade 120, a first handle 130, and a second handle 140. The second blade 120 may be rotatably attached to the second handle 140 at a hinge point 125. The second blade 120 may be locked relative to the second handle 140 by a rotation lock, such as button 127, configured to preclude unintentional rotation between the second blade 120 and the second handle 140 as will be described further below. FIG. 2 illustrates the multipurpose cutting tool of FIG. 1 as shown from the opposite side. As illustrated, the first blade 110 may be rotatably attached to the first handle 130 at hinge point 115. Button 117 may be configured to lock the first blade 110 relative to the first handle 130 to prevent unintentional rotation between the first blade 110 and the first handle 130. The handles may include a metal form with a plastic overmold such that the handles may be strong and provide enough surface area to be ergonomic, while keeping the weight relatively low. While the rotation lock of the illustrated embodiments includes a button (117, 127), further example embodiments of rotation locks may include other mechanisms for preventing rotation, such as a liner-lock, a cam that rotates in/out of position, or other device.

The first blade 110 and the first handle 130, and the second blade 120 and the second handle 140 may be rotatably connected to each other in order to allow the multipurpose cutting tool of the example embodiment to be folded from a deployed position to a folded position in which the tool may be more compact and more easily carried or stored. The details of the folding mechanism will be described in further detail below. While the illustrated embodiment depicts a folding multipurpose cutting tool, embodiments of the present invention may include multipurpose cutting tools which may or may not configured to fold.

The first blade 110 and the first handle 130 may form a first member, while the second blade 120 and the second handle 140 form a second member, regardless of whether the handles are configured to rotate or fold relative to their respective blades. The first member may be rotatably coupled to the second member at hinge point 150. When the first blade 110 and first handle 130 are locked relative to one another, and the second blade 120 and the second handle 140 are locked relative to one another, opening of the handles (i.e., moving the first handle 130 away from the second handle 140) creates a gap 160 there between and simultaneously opens the first blade 110 from the second blade 120. FIG. 3 illustrates the example embodiment of FIG. 1 in the open configuration, with the handles 130, 140 moved away from one another. Closing the handles 130, 140 closes together the blades 110, 120.

A cutting nip 155 is defined between the first blade and the second blade. The cutting nip is the location between the first blade 110 and the second blade 120 where a cutting edge of the first blade 110 engages the cutting edge of the second blade 120. The first handle 130 is generally configured to receive one or more fingers of a user's hand while the second handle 140 is generally configured to receive the thumb of the user's hand. The user may then open and close the cutting tool with a single hand.

FIG. 4 illustrates a perspective view of the cutting nip 155 defined between the first blade 110 and the second blade 120. The first blade 110 of the illustrated embodiment is beveled such that the cutting edge 112 is at the apex of an acute angle formed at an inner edge of the first blade 110. Similarly, the second blade 120 is beveled such that the cutting edge 122 is at the apex of an acute angle formed at an inner edge of the second blade 120. The cutting edges 112, 122 are configured to engage one another at the cutting nip 155. The cutting nip 155 advances along the length of the blades toward the tips of the blades 114, 124 as the blades are closed together. The advancing of the cutting nip 155 enables a cut to be made progressively through a material that is disposed between the blades 110, 120.

In the illustrated embodiment of FIG. 4, the second blade 120 includes a serrated edge 126 adjacent to the cutting edge 122. The serrated edge 126 is configured to engage the material being cut and to assist in holding the material between the blades 110, 120 while the blades are brought together to cut. As the blades 110, 120 engage one another at an angle, and as the cutting nip 155 moves toward the tips 114, 124 of the blades as the cut is made, material being cut may generally tend to be pushed along the blades 110, 120 as the cut is made, thereby reducing the efficiency of the cut. The serrated edge 126 helps to maintain the material within the cutting nip 155 to increase the cutting efficiency.

FIG. 5 illustrates a profile of the serrations 400 of the serrated edge in which the serrations resemble a saw-tooth pattern. The profile of the serrations is illustrated from the perspective of the hinge point of the blades being toward the end 430 while the tip of the blades is toward 440. The direction of each serration 400 is configured to function as a hook to enable material to more easily enter the cutting nip (in the direction from 440 toward 430) while holding the material against movement out of the cutting nip (in the direction from 430 toward 440). In this manner, the serrations may resemble waves breaking toward the hinge point (e.g., 430) of the cutting tool. Said differently, as illustrated in FIG. 5, the angle 460 of a first face of a serration, directed toward the tip 440 may be greater than the angle 470 of a second face of a serration, directed toward the pivot point 430.

The height of the serrations is defined as the distance between the surface from which they extend 415 and the top of a serration 420, represented by "H" in FIG. 5. The height of the serrations may increase as the serrations are closer to the hinge point, toward 430 in order to increase the grip that the serrations may exert on a material to be cut as the material is closer to the hinge point, toward 430. The nominal height of the serrations, relative to the surface from which they extend, may generally be from 0.001 inches to about 0.040 inches. In the illustrated example, the nominal serration height is 0.0087 inches. The increase in height in the serrations from the tip to toward the pivot point may be a linear increase or some other manner of increase. The increased grip closer to the hinge point may be beneficial as, due to the angle of the blades relative to one another when the cutting nip between the blades is closest to the hinge point, the material is more likely to be pushed out of the cutting nip. As the cutting nip advances toward the blade tips when the blades are closed together, the angle of the blades relative to one another is lower such that the material is less likely to be pushed away from the cutting nip 155.

FIG. 6 illustrates a top view of a multipurpose cutting tool according to the embodiment of FIGS. 1-4. The illustrated embodiment includes the first handle 130 and the second handle 140, and the first blade 110 and the second blade 120. The first blade includes a tip 114 and a proximal portion 119 while the second blade also includes a tip 124 and a proximal portion 129. The blades 110, 120 of example embodiments may have a width that is greater at one end of the blade than the other. For example, in the illustrated embodiment, the width "W" of the first blade at the tip 114 may be greater than the width "w" at the proximal portion 119 of the blade 110. The second blade 120 may additionally or alternatively include a width that is greater toward the tip 124 than at the proximal portion 129. A blade width that increases progressively from the proximal portion 119 to the tip 114 may provide an improved cutting nip by ensuring that the cutting edges of each of the first blade 110 and the second blade 120 are in contact at the cutting nip 155. The increase in width may be a linear increase or some other manner of increase. For example, in the illustrated embodiment the increase in width is based upon a varying point curve which begins between the pivot point 150 and the handle 140 at the widest point, becomes narrowest between the pivot point 150 and the beginning of the blade cutting edge, and becomes wider with the greater distance from the pivot point. As the cutting edge of the blades makes contact from the proximal portion of the blades (119, 129) toward the blade tips (114, 124), the increase in blade thickness ensures that the cutting edges intersect at the cutting nip as the blades 110, 120 are gradually pushed away from one another. This gradual thickness increase from the proximal portions to the tips functions as a bias to ensure that the cutting nip maintains firm contact between the cutting edges of the blades as the blades close together and the cutting nip advances from the proximal portions to the tips.

While the width of the blade may vary along the length of the blade, the width of the blades 110, 120 may also vary along their height. For example the blades 110, 120 may be widest proximate the cutting surfaces of each blade and narrower further away from the cutting surfaces. In this respect, the blades may provide material relief during cutting and may further ensure that the cutting edges of the blades meet at the cutting nip. The blades 110, 120 may include a nominal width of between 0.040 inches to about 0.250 inches with the blades of the illustrated embodiment being approximately 0.130 inches.

While the illustrated and above described embodiments of the blades may vary in thickness along two dimensions, further example embodiments may include blades which are bent to provide similar advantages as described above with regard to the cutting edges remaining in contact during cutting. Such blades may include a uniform width or may include varying widths to cooperate with the contours of the blades to ensure the cutting edges of each blade intersect at the cutting nip.

Referring back to FIG. 3, a second cutting nip 190 is defined between a third blade 170 and a fourth blade 180, specifically between a cutting edge of the third blade 170 and a cutting edge of the fourth blade 180. The second cutting nip is configured to provide a higher-force cutting nip 190 relative to the cutting force of the first cutting nip 155. The second cutting nip 190 is structured such that the opening between the third blade 170 and the fourth blade 180 is positioned closer to the hinge point 150 than the first cutting nip 155, and the second cutting nip can become fully opened (i.e., opened to a maximum opening size) with a lower degree of travel of the handles 130, 140. Such a configuration allows the second cutting nip 190 to receive an article to be cut close to the hinge point 150 without requiring the handles 130, 140 to be opened to beyond a point at which a single hand can comfortably operate the handles 130, 140.

While a variety of materials may be cut by the multipurpose cutting tool 100 of the illustrated embodiments, the first cutting nip 155 may be well-suited for cutting materials such as paper, textiles, relatively thin metals, plastics, various sheet-stock materials, etc. The first cutting nip 155 may also be well-suited for cutting items which require multiple cuts to complete a cut across the material. For example, the first cutting nip 155 may be well-suited for cutting across a yard of fabric; however, the cut may require multiple cycles of opening and closing the blades relative to one another.

The second cutting nip 190 may be well-suited for cutting thicker materials than that of the first cutting nip 155, however, the materials best-suited for the second cutting nip may be those in which the entire cut may be performed by one or two cycles of the third and fourth cutting blades 170, 180. For example, the second cutting nip 190 may be well-suited for cutting a ring (e.g., a gold wedding band) from a finger for emergency removal of the ring when it cannot be easily slid off of the finger.

While some cutting tools may include a set of cutting blades between the handles (e.g., between 130 and 140 in the gap 160), the second cutting nip 190 of the illustrated embodiment is not disposed in the gap 160. The second cutting nip 190 is disposed in a location that allows the second cutting nip 190 to receive articles to be cut that could not reasonably be received within the gap 160. For example, a portion of jewelry ring typically worn on the finger of a user may be inserted into the second cutting nip 190 whether the ring is still on the finger of a wearer or not, a feature not possible with a cutting nip defined within the gap 160. Similarly, cables or wires which may be difficult to access or which may have little room around them may be received by the second cutting nip 190. The profile shape of the third blade 170 may include a rounded tip to enable the third blade 170 to be inserted under a ring that is worn by a wearer or to otherwise separate an article to be cut from any surrounding material.

FIG. 7 depicts an enlarged perspective view of the second cutting nip 190 including the third blade 170 and the fourth blade 180. The third blade 170 includes a rounded tip 174 and a cutting surface 176 that is generally perpendicular to the side of the blade, resulting in a cutting edge 172 that forms a substantially right angle. Conversely, the fourth blade 180 includes a beveled surface resulting in a cutting edge 182 at the apex of an acute angle of the fourth blade 180. The cutting edges 182, 172 are configured to engage one another as the handles 130, 140 are closed together. The proximity of the second cutting nip 190 to the hinge point 150 and the length of the handles 130, 140 from the hinge point enable a large force to be applied to an object to be cut by the third blade 170 and the fourth blade 180 with a nominal amount of force applied at the handles. The relatively large moment arm of the handles 130, 140 versus the relatively short moment arm of the third blade 170 and the fourth blade 180 enable this mechanical advantage.

As outlined above, the handles 130, 140 of the multipurpose cutting tool of the illustrated embodiment of FIGS. 1-3 are configured to fold relative to the blades 110, 120. For example, the first handle 130 is configured to rotate relative to the first blade 110 at hinge point 115. Similarly, the second handle 140 is configured to rotate relative to the second blade 120 at hinge point 125. With reference to FIG. 8A which depicts an enlarged view of the front side of the cutting tool of FIG. 1, button 127 is biased in a raised position (e.g., by a spring disposed within the button) to engage the handle 140. The button 127 engages the handle 140 proximate the engagement interface 200. The button 127 precludes the handle 140 from rotating about the hinge point 125 in the counter-clockwise direction. Handle 140 may be prevented from rotating further about hinge pin 125 in the clockwise direction by a physical stop, such as a pin or detent that prohibits rotation beyond the deployed position illustrated in FIGS. 1-3.

Due to possible manufacturing variations in the handles 130, 140 and the blades 110, 120, and because it may be important for a handle to be held fixed relative to a respective blade, the button 127 may be configured to take-up manufacturing variances and ensure that the handle 140 is engaged in the proper position. In order to achieve this variance take-up, the button 127 may be configured with a particular profile as illustrated in FIG. 8B which depicts a cross-section of the handle 140, blade 120, and the button 127. The button 127 is received within a pocket 800 within the blade 120 and may be biased into engagement with the handle 140 by a biasing element, such as spring 810. The button 127 may include a flat top surface 805 configured to be pressed by a user and an engagement surface 820 which is substantially parallel to an engagement surface 825 of the handle 140. However, due to manufacturing tolerances, the engagement surface 820 of the button may not engage the engagement surface of the handle 825 at exactly the position where the handle 140 is rotationally fixed relative to the blade 120. As such, the button 127 may further be configured with an angled surface 830 that is configured to engage a portion of the engagement surface 825 of the handle 140 at the point where the handle 140 is to be fixed relative to the blade 120. The area of the angled surface 830 which engages the engagement surface 825 may be determined based upon the distance the button 127 is able to be raised from the pocket 800. While the angled surface 830 may engage the engagement surface 825 of the handle 140, it may not be sufficient to hold the handle 140 rotationally fixed to the blade 120 under relatively large forces (which are not typically encountered in the direction in which the button 127 prevents rotation); however, should the engagement surface 825 of the handle 140 be forced past the angled surface 830, the rotation of the handle 140 relative to the blade 120 will be stopped by the engagement surface 820 of the button 127, thereby preventing any further rotation and maintaining the functionality of the cutting tool.

In response to a user depressing the button 127, the handle 140 is permitted to rotate counter clockwise about hinge point 125. FIGS. 8A-10 illustrate the second handle 140 being rotated from the deployed position of FIGS. 1-3 to the folded position of FIG. 11. Once the handle 140 begins to rotate in the counter-clockwise direction, the handle 140 itself holds down the button 127 such that a user is not required to continue to depress the button 127 after the initial rotation. An inner edge of the second handle 140 may be configured with a detent that is at least partially engaged by the button 127 when the handle 140 is in the folded position. The detent may secure the handle in the folded position, but may be overcome by a user pulling the handle 140 from the folded position without requiring separate depression of the button 127.

Similarly, the first handle 130 may be configured to rotate about hinge point 115 to a folded position. As illustrated in FIG. 2, button 117 which may be biased in the raised position, may be configured to prevent rotation of the handle 130 relative to the blade 110 about hinge point 115 in the counter-clockwise direction when the button 117 is in the raised position. As with the second handle 140, when in the deployed position of FIG. 2, the first handle 130 may be prevented from rotating in the clockwise direction about hinge point 115 by a mechanical engagement, such as the handle 130 engaging a pin or detent. In response to the button 117 being depressed, the handle 130 may be permitted to rotate in the counter-clockwise direction toward the folded position. FIG. 12 illustrates the cutting tool 100 with both the first handle 130 and the second handle 140 in the folded position.

An additional feature of the illustrated embodiment of FIGS. 1-12 may preclude over-rotation of the handles and may preclude the blades 110, 120 from being opened while the handles 130, 140 are folded relative to the blades. As shown in FIG. 1, the first handle 130 may include a blade stop 850. In the illustrated embodiment, the blade stop 850 may be formed into the over-molded portion of the handle 130. The blade stop 850 is configured to engage the bottom of blade 120 when handle 130 rotates about its pivot hinge point 115. Similarly, as shown in FIG. 2, the second handle 140 includes blade stop 860 which is configured to engage the top of the first blade 110 when the second handle 140 is rotated about its hinge point 125. As such, the blade stop 850 of the first handle 130 is configured to engage the second blade 120 while the blade stop 860 of the second handle 140 is configured to engage the first blade when the handles 130, 140 of the cutting tool 100 are in the folded position. Therefore, when the handles 130, 140 are in the folded position, as shown in FIG. 9, the blades stops 850 and 860, are configured to capture the blades there between, precluding the blades 110, 120 from opening or being rotated out from between the handles.

The direction of rotation of each of the first handle 130 and the second handle 140 relative to the respective blades to which they are rotatably attached has been described as "counter-clockwise" when the respective handle described is facing a viewer. The direction of rotation used to move the handles from the deployed position to the folded position may be selected based upon the rigidity of the handles when locked into engagement with a respective blade. For example, when the multipurpose cutting tool is used to cut a material, particularly a hard or difficult material to cut, a substantial amount of force may be exerted between the handles 130, 140 to close them together in order to make the cut. Conversely, when the handles are opened to separate the blades, the amount of force is significantly lower. Therefore, it may be desirable for the direction of folding of each of the handles to be in the same direction in which the handles move when the handles are separated. Thus, the buttons 117, 127 configured to preclude rotation are not required to sustain the forces applied to the handles while the handles are brought together during a cutting stroke. A secure engagement between a respective handle and blade may be implemented for when the handles 130, 140 are closed together for cutting. An example embodiment of such a secure engagement is illustrated in FIG. 13 which depicts the first blade 110 and first handle 130, with many features not shown for ease of illustration, and with the blade 110 being shown transparent for illustrative purposes.

The illustrated embodiment of FIG. 13 shows a pin 300 of the handle portion 130 which rides in channel 310 of the blade 110 when the handle 130 rotates about the hinge at 305 relative to the blade 110 in the direction of arrow 330 toward the folded position. When the handle is rotated from the folded position, against arrow 330, the pin rides in channel 310 until the pin engages the hard stop 320. The pin 300, in cooperation with the hard stop 320, preclude further rotation of the handle 130 relative to the blade 110 in the direction opposite arrow 330. The button 117 of FIG. 2 is configured to engage the handle at the same time that the pin 300 engages the hard stop 320, thereby precluding the handle from rotating relative to the blade 110 along arrow 330. Thus, the handle 130 becomes locked in the deployed position relative to the blade 110 and a secure mechanical connection is established to transmit the forces of closing the handles 130, 140 together to cut material.

Referring back to FIG. 12, further illustrated is a clip 210 configured to secure the multipurpose cutting tool, in either the folded position or the deployed position, within a pocket, a holster, or otherwise hold the tool securely in an accessible location. A pointed carbide tip 230 may be included in one or both of the overmolded handles 130 and/or 140. The carbide tip may be used, for example, to break glass, such as a tempered glass window. One or both of the handles may further be configured with a loop 220 configured to receive a lanyard, keychain, or other attachment. The loop may be formed of the metal handle substrate or the plastic overmolding of the handle. The loop may optionally be used to tether the cutting tool to a user or object.

Some embodiments of a multipurpose cutting tool may further include a fixed-blade cutting tool as illustrated in FIG. 14 in which the fixed-blade cutting tool 500 is in the stowed position. The fixed-blade cutting tool 500 may be rotatable about an axis relative to the second handle 140 and, in some embodiments, may share the same axis of rotation as the second handle 140 relative to the blade 110. In the illustrated embodiment, the fixed-blade cutting tool 500 shares the rotation point 125 with the handle 140. The fixed-blade cutting tool 500 may be held in the illustrated stowed position by a detent engaged by a protrusion as will be further outlined below.

FIG. 15 illustrates the fixed-blade cutting tool 500 in the deployed position relative to the multipurpose cutting tool 100. The fixed-blade cutting tool 500 may include a first beveled surface 510 and a second beveled surface 520 arranged at an angle relative to one another as shown. The fixed-blade cutting tool 500 may receive between the beveled cutting surfaces 510, 520 the material that is to be cut. An example of a material to be cut may include, for example, a seatbelt of a vehicle. The beveled cutting surfaces may have a sharp leading edge such that as the fixed-blade cutting tool 500 is drawn across material, the material is forced into the apex between the beveled cutting surfaces and efficiently sliced.

The fixed blade cutting tool 500 may further include a wrench feature 530. The wrench feature 530 may be configured based upon the intended use or target user of the multipurpose cutting tool. For example, a multipurpose cutting tool configured for use by emergency personnel (e.g., paramedics, fire fighters, police officers) may include a wrench feature sized to accommodate a pressure regulator valve stem, which may be found on oxygen tanks in the medical field. A multipurpose cutting tool configured for use as a camping accessory may include a one-half inch hex-head wrench feature as the one-half inch size is relatively common.

The wrench feature 530 and/or the fixed-blade cutting tool 500 may benefit from a locking feature which may secure the fixed-blade cutting tool 500 in the deployed position. The locking feature 540 of the illustrated embodiment of FIG. 15 may include a liner lock-type locking mechanism in which the locking feature is biased into the locking position illustrated in FIGS. 15 and 16. The locking feature 540 may include an element that is made of a resilient material that serves to bias the locking feature 540 into engagement with the fixed-blade cutting tool 500. In an example embodiment, the locking feature 540, the fixed-blade cutting tool 500, and the blades 110, 120 may each be made from 420 stainless steel; however, the locking feature 540 may have a lower carbon content and lower hardness than the cutting tool 500 or the blades 110, 120 to improve the spring-type shape retention properties of the locking feature 540, while the higher carbon content and higher hardness of the cutting tool 500 and the blades 110, 120 improves the durability of the cutting edge.

As illustrated in FIG. 16, the locking feature may be disposed in a recess 544 within a portion 546 of the handle 140. When the fixed-blade cutting tool 500 is in the stowed position as shown in FIG. 14, the locking feature 540 may be received by the recess 544, thereby permitting the fixed-blade cutting tool to fold substantially flush into the handle 140. The locking feature 540 may include a retention feature 548, such as a raised tab, configured to engage a corresponding recess on the fixed-blade cutting tool 500. The retention feature 548 cooperating with the corresponding recess on the tool 500 to maintain the tool in the stowed position of FIG. 14. The force with which the retaining feature 548 may hold the tool 500 in the stowed position may be sufficient to prevent accidental rotation of the tool 500 relative to the handle 140, but may be overcome in response to a user rotating the tool to the deployed position.

In response to a user rotating the fixed-blade cutting tool 500 from the stowed position of FIG. 14 to the deployed position of FIGS. 15 and 16, the locking feature 540 may spring from the recess 544 to the locked position, engaged with the tool 500. FIG. 17 illustrates the engagement between the locking feature 540 and the fixed-blade cutting tool 500. The locking feature includes a substantially flat engagement surface 550 configured to engage a corresponding substantially flat engagement surface 560 of the fixed-blade cutting tool 500. In response to the engagement surface 550 of the locking feature 540 engaging the engagement surface 560 of the tool 500, rotation of the tool 500 about the hinge point 125 is prevented. In order to disengage the locking feature 540 from the tool 500, a user may press the locking feature 540 proximate the surface 570 against the bias to depress the locking feature into the recess 544. Upon the locking feature 540 entering the recess 544, the fixed-blade cutting tool 500 may be rotated to the stowed position. The locking feature 540 may be held in the recess by the tool 500 after initial rotation in the direction of the stowed position such that a user does not need to maintain pressure on the locking feature.

As it may be important to securely hold the fixed-blade cutting tool 500 in the deployed position, the tolerances between the engagement surface 550 of the locking mechanism and the engagement surface 560 of the fixed-blade cutting tool may be relatively small. Therefore manufacturing the fixed-blade cutting tool 500 and the locking mechanism may require precision cutting, grinding, and assembly steps. A mechanism by which the assembly precision may be improved includes a mechanism for accurately locating the locking feature 540 relative to the recess 544. The surface 590 of the locking mechanism 540 may be configured to be securely seated against a corresponding locating surface in the recess 544. In order to ensure the proper location of the locking mechanism 540, the rivets 580 or other fasteners used to secure the locking feature 540 to the recess 544 may be received in holes that are angled toward the corresponding locating surface of the recess 544. Driving the rivets 580 or other fasteners into the angled holes may drive the surface 590 of the locking feature 540 into engagement with the locating surface of the recess 544.

While the fixed-blade cutting tool 500 illustrated in FIGS. 15 and 16 is deployed while the multipurpose cutting tool 100 is in the folded position, the fixed-blade cutting tool may be deployed while the cutting tool 100 is in the deployed position as illustrated in FIG. 18.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cutting tool comprising:
   a first member comprising a first blade, a third blade, and a first handle; and
   a second member pivotably coupled to the first member, comprising a second blade, a fourth blade, and a second handle;
   wherein a first cutting nip is defined between the first blade and the second blade, a second cutting nip is defined between the third blade and the fourth blade, and a gap is defined between the first handle and the second handle;
   wherein at least one of the first blade and the second blade comprises serrations, wherein each of the serrations comprises a first face facing away from the first handle, and a second face facing toward the first handle, wherein an angle between a surface from which the serrations extend and the first face of each serration is greater than an angle between the surface and the second face of each serration;
   wherein the serrations of the at least one of the first blade and the second blade increase from a first height proximate a tip of the blade to a second height, taller than the first height, proximate a pivot point between the first blade and the second blade;
   wherein each of the gap, the first cutting nip, and the second cutting nip are configured to be simultaneously opened and closed as the first member pivots relative to the second member, and
   wherein the gap, the first cutting nip, and the second cutting nip are each disposed at mutually exclusive positions about a pivot point between the first member and the second member.

2. The cutting tool of claim 1, wherein the second cutting nip is configured to apply a higher cutting force relative to the first cutting nip in response to equal closing force applied between the first handle and the second handle.

3. The cutting tool of claim 1, wherein the first cutting nip and the second cutting nip each extend from the pivot point, and wherein neither the first cutting nip nor the second cutting nip are disposed between the first handle and the second handle.

4. The cutting tool of claim 1, wherein at least one of the third blade or the fourth blade comprises a rounded tip.

5. A cutting tool comprising:
   a first pair of blades defining a first cutting nip, wherein the first pair of blades are pivotable with respect to one another at a pivot point, wherein the first pair of blades comprises at least one serrated blade, and wherein a height of the serrations increases from a first height proximate a tip of the at least one serrated blade to a second height, greater than the first height, proximate the pivot point;
   a second pair of blades defining a second cutting nip, wherein the second pair of blades are pivotable with respect to one another at the pivot point; and
   a pair of handles defining a gap therebetween that are pivotable with respect to one another at the pivot point;
   wherein neither the first cutting nip nor the second cutting nip are disposed within the gap.

6. The cutting tool of claim 5, wherein at each relative position between the first pair of blades and the second pair of blades throughout a range of movement of the first and second pair of blades, the first cutting nip defined where the first pair of blades intersect is disposed at a first distance from the pivot point, and the second cutting nip defined where the second pair of blades intersect is disposed at a second distance from the pivot point, wherein the second distance is shorter than the first distance.

7. The cutting tool of claim 5, wherein the cutting nip defined between the second pair of blades is formed between an acute angle of a first blade, and a right angle of a second blade.

8. The cutting tool of claim 7, wherein the second blade of the second pair of blades comprises a rounded leading edge.

9. The cutting tool of claim 5, wherein the first cutting nip and the second cutting nip are positioned on opposing sides of the pivot point.

10. The cutting tool of claim 5, wherein each serration of the at least one serrated blade comprises a first face facing the tip of the serrated blade and a second face facing the pivot point, wherein an angle between a surface from which the serrations extend and the first face is greater than an angle between the surface and the second face.

* * * * *